(12) United States Patent
Skorheim et al.

(10) Patent No.: US 11,900,245 B2
(45) Date of Patent: Feb. 13, 2024

(54) DECISION MAKING BASED ON SPIKE TIME DEPENDENT PLASTICITY OF A NEURAL NETWORK

(71) Applicants: The Regents of the University of California, Oakland, CA (US); Steven Skorheim, La Jolla, CA (US)

(72) Inventors: Steven Skorheim, La Jolla, CA (US); Maksim Bazhenov, La Jolla, CA (US); Pavel Sanda, La Jolla, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 799 days.

(21) Appl. No.: 16/643,508

(22) PCT Filed: Aug. 30, 2018

(86) PCT No.: PCT/US2018/048984
§ 371 (c)(1),
(2) Date: Feb. 28, 2020

(87) PCT Pub. No.: WO2019/046663
PCT Pub. Date: Mar. 7, 2019

(65) Prior Publication Data
US 2020/0193289 A1 Jun. 18, 2020

Related U.S. Application Data

(60) Provisional application No. 62/552,279, filed on Aug. 30, 2017.

(51) Int. Cl.
*G06N 3/04* (2023.01)
*G06N 3/08* (2023.01)
(Continued)

(52) U.S. Cl.
CPC ............... *G06N 3/08* (2013.01); *G06N 3/049* (2013.01); *G06N 3/088* (2013.01)

(58) Field of Classification Search
CPC ........... G06N 3/049; G06N 3/08; G06N 3/088
See application file for complete search history.

(56) References Cited

U.S. PATENT DOCUMENTS 9,020,870 B1 * 4/2015 Daily .................... B25J 9/00
706/20
2013/0325777 A1 12/2013 Petre et al.
(Continued)

FOREIGN PATENT DOCUMENTS

WO 2014081639 A1 5/2014

OTHER PUBLICATIONS

Carlson, Kristofor D., et al. "Biologically plausible models of homeostasis and STDP: stability and learning in spiking neural networks." The 2013 international joint conference on neural networks (IJCNN). IEEE, 2013. (Year: 2013).*
(Continued)

*Primary Examiner* — Hal Schnee
(74) *Attorney, Agent, or Firm* — Sheppard, Mullin, Richter & Hampton LLP

(57) ABSTRACT

Systems, devices, and methods are disclosed for decision making based on plasticity rules of a neural network. A method may include obtaining a multilayered model. The multilayered model may include an input layer including one or more input units. The multilayered model may include one or more hidden layers including one or more hidden units. Each input unit may have a first connection with at least one hidden unit. The multilayered model may include an output layer including one or more output units. The method may also include receiving an input at a first input unit. The method may include sending a first signal
(Continued)

from the first input unit to at least one hidden unit via a first connection comprising a first strength. The method may also include making a decision based on the model receiving the input.

17 Claims, 16 Drawing Sheets

(51) Int. Cl.
    *G06N 3/049*     (2023.01)
    *G06N 3/088*     (2023.01)

(56) References Cited

U.S. PATENT DOCUMENTS

| | | | |
|---|---|---|---|
| 2014/0012789 A1 | 1/2014 | Bazhenov et al. | |
| 2014/0058988 A1* | 2/2014 | Lai | G06N 3/02 706/14 |
| 2015/0106310 A1 | 4/2015 | Birdwell et al. | |
| 2017/0286829 A1* | 10/2017 | Chen | G06N 3/063 |
| 2017/0337473 A1* | 11/2017 | Bernert | G06N 3/049 |
| 2018/0225562 A1* | 8/2018 | van der Made | G06N 3/063 |
| 2018/0330228 A1* | 11/2018 | Koelmans | G06N 3/08 |

OTHER PUBLICATIONS

Skorheim, Steven, Peter Lonjers, and Maxim Bazhenov. "A spiking network model of decision making employing rewarded STDP." PloS one 9.3 (2014): e90821. (Year: 2014).*

Bol, Kieran, et al. "Modeling cancelation of periodic inputs with burst-STDP and feedback." Neural Networks 47 (2013): 120-133. (Year: 2013).*

Tavanaei, Amirhossein, and Anthony S. Maida. "Multi-layer unsupervised learning in a spiking convolutional neural network." 2017 international joint conference on neural networks (IJCNN). IEEE, 2017. (Year: 2017).*

Zeng, Yi, Tielin Zhang, and Bo Xu. "Improving multi-layer spiking neural networks by incorporating brain-inspired rules." Sci. China Inf. Sci. 60.5 (2017): 1-11. (Year: 2017).*

International Search Report and Written Opinion in PCT/US18/48984, dated Nov. 8, 2018.

Zheng et al., "Network Self-Organization Explains the Statistics and Dynamics of Synaptic Connection Strengths in a Cortex," PLOS Computational Biology, <www.poloscompbiol.org>, Jan. 2013, vol. 9, Issue 1, e1002848, Retreived from the internet on Oct. 24, 2018 at <www.ncbi.nih/gov/pmc/articles/PMC3536614/pdf/pcbi.1002848.pdf>.

International Preliminary Report on Patentability in PCT/US2018/048984, dated Mar. 3, 2020.

* cited by examiner

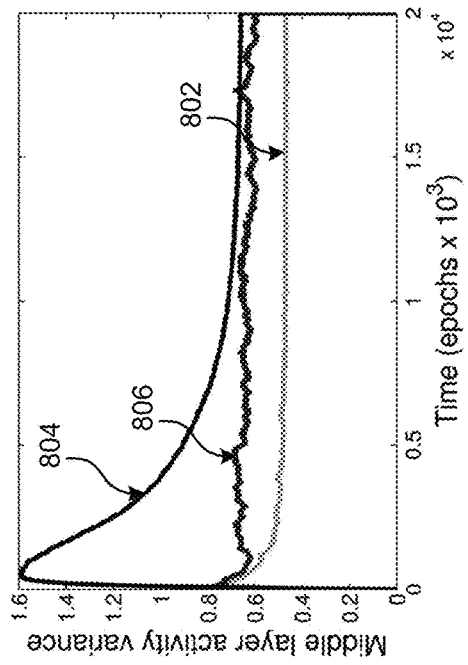
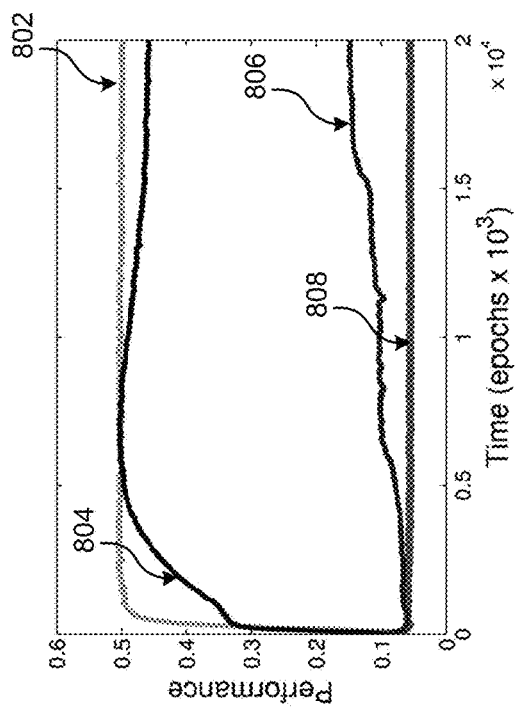
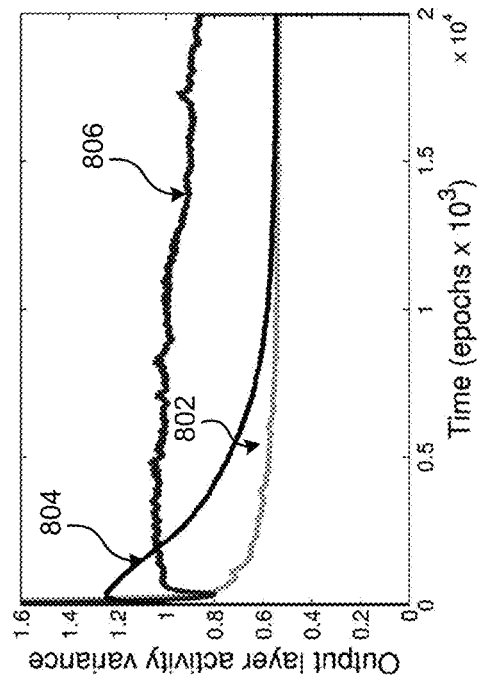
FIG. 8A
FIG. 8B
FIG. 8C

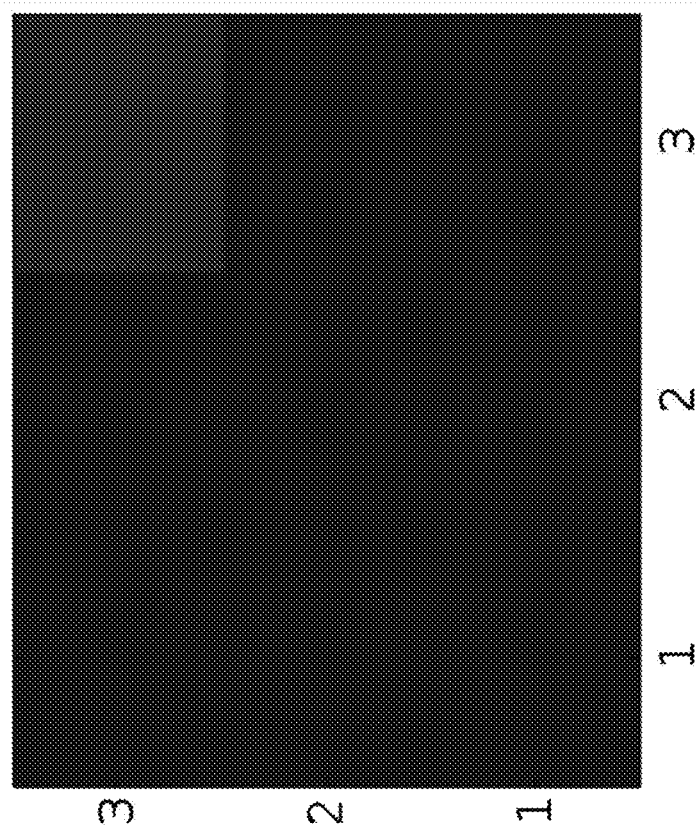
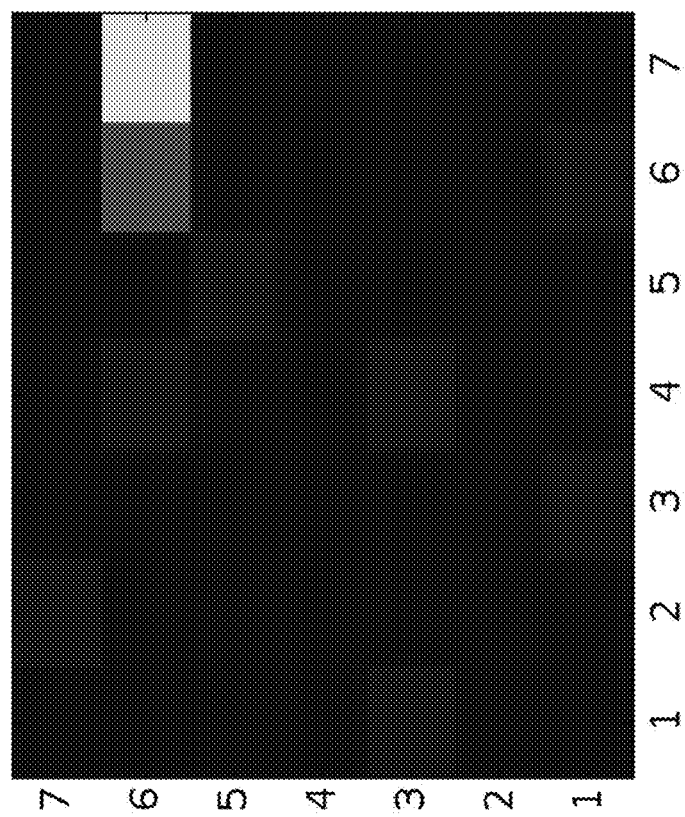
FIG. 10A
FIG. 10B

DECISION MAKING BASED ON SPIKE TIME DEPENDENT PLASTICITY OF A NEURAL NETWORK

CROSS REFERENCE TO RELATED APPLICATIONS

The present application is a U.S. National Phase under 35 U.S.C § 371 of International Application No. PCT/US2018/048984, filed Aug. 30, 2018, which claims priority to U.S. Provisional Patent Application No. 62/552,279, filed Aug. 30, 2017, the entire contents of which are incorporated herein by reference in its entirety

OTHER INFORMATION

This invention was made with government support under N00014-16-1-2829 awarded by the Office of Naval Research. The Government has certain rights in the invention.

TECHNICAL FIELD

The present disclosure is generally related to artificial intelligence behavior. In particular, some embodiments of the present disclosure relate to modeling biological neural networks employing spike time dependent plasticity.

BRIEF DESCRIPTION OF THE EMBODIMENTS

Embodiments of the disclosure present a model of a biological neural network that employs a combination of reward-modulated and non-reward-modulated signals to solve tasks involving learning, such as, for example, acquisition tasks. Embodiments disclosed herein may incorporate multiple processing layers. Some tasks, such as those that respond differently to an input depending on the information from a second input, or multiple other inputs, may benefit from such multiple layers of processing. In some embodiments, the model may include advanced pattern discrimination and learning in a model with multiple processing layers. The model may include both reward-modulated signals and non-reward-modulated signals and implement multiple balancing mechanisms.

By way of example, a model may include two processing layers. The first layer of this model may include unsupervised (unrewarded) learning to classify the input while the second layer (based on reward-modulated signal) may be responsible for decision making based on reinforcement learning. As a whole, the model, represented by the brain of an agent moving through an unknown environment, may even continuously learn distinct input patterns in accordance to the reward- and punishment-modulated signals. The model may learn with or without need for initial training by any labeled data set.

According to an embodiment of the disclosed technology, a method for decision making includes obtaining a multilayered model. The multilayered model may include an input layer including one or more input units. The multilayered model may include one or more hidden layers including one or more hidden units. Each input unit may have a first connection with at least one of the one or more hidden unit. The multilayered model may include an output layer including one or more output units. The method may include receiving an input at a first input unit. The method may include sending a first signal from the first input unit to at least one of the one or more hidden units on a first hidden layer via a first connection including a first strength. The method may include making a decision based on the model receiving the input.

In embodiments, each of the one or more hidden units may be connected to another one of the one or more hidden units via an intralayer connection. Each intralayer connection may include a given strength.

In embodiments, the at least one hidden unit receiving the first signal is connected to one or more of the one or more output units via one or more output layer connections. Each output layer connection may include a given strength.

In embodiments, the method may further include sending a second signal from the at least one hidden unit on the first hidden layer to a second hidden unit on the first hidden layer via a first intralayer connection including a second strength. The method may include sending a third signal from the second hidden unit on the first hidden layer to one or more of the one or more output units via a third connection including a third strength.

In embodiments, the method may further include sending a fourth signal from the at least one hidden unit on the first hidden layer to a third hidden unit on a second hidden layer. The method may include sending a fifth signal from the third hidden unit on the second hidden layer to one or more of the one or more output units via a fourth connection including a fourth strength.

In embodiments, a strength of one or more signals being received by a unit is kept constant.

In embodiments, a strength of one or more signals being sent by a unit is kept constant.

In embodiments, a strength of one or more signals with a low rate of sending the one or more signals is increased before arriving at a subsequent layer and the strength of one or more signals with a high rate of sending the one or more signals is decreased before arriving at a subsequent layer.

In embodiments, the method may further include sending a reward signal to modulate one of the one or more signals between the hidden layer and the output layer, such that strengths of one or more connections associated with the reward signal increases. The method may include sending a punishment signal to modulate one of the one or more signals between the hidden layer and the output layer, such that strengths of one or more connection associated with the punishment signal decrease.

In embodiments, the method may further include adjusting a strength of a given connection between two units by dividing a current strength of the given connection by the average strength of the given connection over a period of time.

In embodiments, the method may further include randomly selecting one of the one or more output units to make the decision based on a user selected chance value.

In further embodiments, a system for decision making may include one or more processors and a memory for storing instructions that, when executed by the one or more processors, cause the system to perform a number of operations. One such operation may be to obtain a model. The model may include a first set of layers including one or more input layers. Each input layer includes one or more input layer units. The model may further include a second set of layers including middle layers. Each middle layer includes one or more middle layer units. The model may include a third set of layers including one or more output layers. Each output layer includes one or more output layer units. The model may further include balancing mechanisms to affect signals between the three sets of layers and the corresponding strength of the signals. Another such operation is to receive an input at a first set of layers. Yet another operation is to send a first signal from the first set of layers to the second set of layers via a first connection including a first strength. Another operation is to make a decision based on the model receiving the input.

In embodiments, each of the one or more units in a layer is connected to another one of the one or more units in the layer via an intralayer connection. Each intralayer connection includes a given strength.

In embodiments, the at least one hidden unit receiving the first signal is connected to one or more of the one or more output units via one or more output layer connections. Each output layer connection includes a given strength.

In embodiments, another operation is to send a second signal from the at least one hidden unit on the first hidden layer to a second hidden unit on the first hidden layer via a first intralayer connection including a second strength. Yet another such operation is to send a third signal from the second hidden unit on the first hidden layer to one or more of the one or more output units via a third connection including a third strength.

In embodiments, another operation is to send a fourth signal from the at least one hidden unit on the first hidden layer to a third hidden unit on a second hidden layer. Yet another such operation is to send a fifth signal from the third hidden unit on the second hidden layer to one or more of the one or more output units via a fourth connection including a fourth strength.

In embodiments, a strength of one or more signals being sent by a unit is kept constant.

In embodiments, a strength of one or more signals with a low rate of sending the one or more signals is increased before arriving at a subsequent layer and the strength of one or more signals with a high rate of sending the one or more signals is decreased before arriving at a subsequent layer.

In embodiments, another operation is to send a reward signal to modulate one of the one or more signals between the hidden layer and the output layer, such that strengths of one or more connections associated with the reward signal increases. Another such operation is to send a punishment signal to modulate one of the one or more signals between the hidden layer and the output layer, such that strengths of one or more connection associated with the punishment signal decrease.

In further embodiments, a model based on biological neural networks is disclosed. The model including multiple layers. A first layer includes one or more input units. A second layer includes one or more middle layers Each middle layer having one or more middle units. A third layer includes one or more output units. The model also includes one or more balancing mechanisms to affect one or more signals between the multiple layers and a corresponding strength of the signals. The model may also include a signal modulator generator to generate one or more modulator signals to modulate the one or more signals coming from the middle layer to the third layer after a decision is made.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

Various embodiments are disclosed herein and described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 8A illustrates an graph of model performance with no inhibition, in accordance with various embodiments of the present disclosure.

FIG. 8B illustrates a coefficient of variance in the middle layer per epoch of the middle layer, in accordance with various embodiments of the present disclosure.

FIG. 8C illustrates a coefficient of variance in the output layer, in accordance with various embodiments of the present disclosure.

FIG. 10A illustrates a characteristic middle layer unit that has become responsive to a pair of elements, in accordance with various embodiments of the present disclosure.

FIG. 10B illustrates an excited top-right output unit which moves a virtual agent toward an element pair, in accordance with various embodiments of the present disclosure.

Figure 1A:
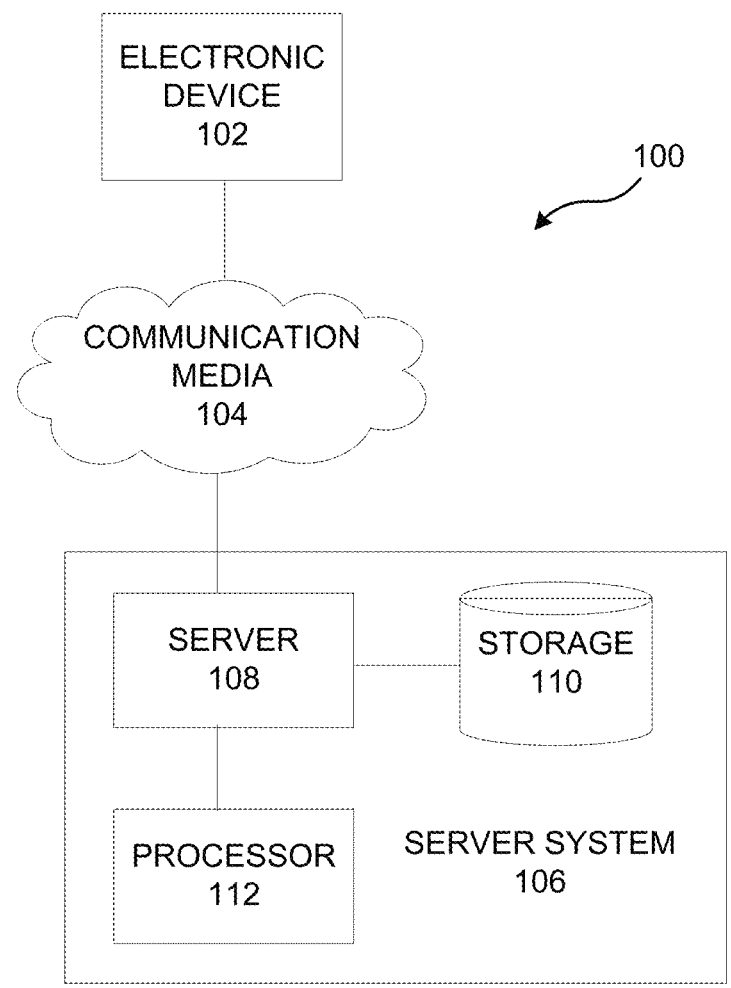
FIG. 1A depicts an example environment, which may be used in connection with implementing embodiments of the disclosed systems, methods, and devices.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Biological neural networks process information in multi-layered steps before sensory information can be interpreted and translated into a behavior or action. The brain can learn and respond to changing environments based on patterns developed over time. Eventually, information gathered from the senses may reach decision centers (such as lateral intraparietal cortex) that govern behavior and are under the influence of reward-modulated signals. Biological neural networks may learn using various cellular level mechanisms. One such cellular level mechanism involves spike time dependent plasticity ("STDP") and synaptic changes, which are junctions, or connections, where units communicate. STDP relies on the timing of action potentials, or nerve impulses, of both pre- and postsynaptic cells to determine changes in synaptic strength. Basic STDP capable of unsupervised learning may increase the synapse strength when a presynaptic cell fires shortly before a postsynaptic cell and decrease the synapse strength when the postsynaptic cell fires first. By storing STDP events as synaptic tags, a reward-modulated signal may enable a model to perform reinforcement learning.

Accordingly, embodiments are illustrated for decision making based on STDP. In other embodiments, other plasticity rules changing connections between units, similar but not necessarily identical to STDP (e.g., based on rate of unit activity or presence/absence of any response), can be used. The decision making may be determined by a model with two or more processing layers. A first layer of the model may use unsupervised (unrewarded) learning to classify the input while the second layer is responsible for decision making. In one embodiment, the model may simulate how an agent may move through an unknown environment having elements where reward and punishment-modulated signals may affect the agent's movement. Additional processing layers may enable the model to solve more complex tasks, such as, for example, a complex acquisition task, involving discrimination between distribution patterns of elements in an environment. By punishing the model when an incorrect decision is made (e.g., a vertical arrangement of elements), the model may be required (a) to identify the unrewarded, or punished, pattern by recognizing the arrangement of the elements and (b) to learn to move toward a rewarded pattern (a horizontal arrangement of elements) and away from the punished pattern (vertical arrangement of elements).

The model may simulate a biological neural network and corresponding STDPs, using balancing mechanisms, reward-modulated signals, and noise. In one example, which will be used herein, a virtual environment may be generated. The virtual environment may have one or more elements. A virtual agent may be generated to acquire or collect the one or more elements based on the model.

The model may use reward-modulated signal to train the multilayered model to solve complex tasks, such as, for example, the discrimination of elements based on an agent's movement patterns and the element distribution pattern. The model may analyze pattern classifications based on reward and punishment-modulated signals. In embodiments, a first environment shape may be associated with a reward-modulated signal while a second environment shape may be associated with a punishment-modulated signals, or an unmodulated signal. The model may be configured to maximize a number of reward-modulated signals. In embodiments, the punishment associated with wrong elements (vertical pattern) may be lower than the rewards associated with correct elements (horizontal pattern). In some embodiments, the punishment may be less than about half of the effect of the reward. It should be appreciated that other values may be appropriate for different tasks and objectives. Other embodiments may include, but are not limited to, unmanned robot navigation and human navigation assistance.

FIG. 1A depicts example environment 100, which may be used in connection with implementing embodiments of the disclosed systems, methods, and devices. By way of example, the various below-described components of FIG. 1A may be used for decision making based on STDPs or other plasticity rules. For example, a model for decision making may include two or more layers. The model may be stored in storage 110, and may be retrieved, obtained, or received by electronic device 102. In embodiments, electronic device 102 and server system may be integrated into a single package, even though they are shown as separate in FIG. 1A. The model may be used, for example, to accomplish complex tasks, such as collecting elements in an environment. The model may include one or more of normalization mechanisms, balancing mechanisms, noise, and other features. These features may be selected or programmed by a user based on the model's given task or objective.

Normalization mechanisms may prevent model performance decline over time by dynamically reducing the magnitude of strong signals based on an average value of signals over a period of time. In embodiments, the normalization may occur between the input layer and middle layer, the input layer and output layer, and the middle layer and output layer. The signal magnitude for a connection may be normalized by an average value of signals created by the connection over an extended period before sending the signal magnitude to the next layer. Accordingly, a connection that may regularly experience strong signals may progressively reduce the effect from new signals. Learning times may be improved because rarely used and weak connection may develop more rapidly in the learning process. Normalization may promote competition between connections that have very few strong signals and connections with many strong signals and eliminate bias toward connections with higher activity. Normalization may increase the strength of connection inputs for units with a low average activity rates and decrease the strength of connection inputs for units with a high average activity. Whenever there is variation in element density near the agent, it may be important to maintain comparable spiking rates in output units.

Balancing mechanisms may include one or more of connection strength balancing, firing rate balancing, inhibitory balancing, and other balancing mechanisms, as described herein. The balancing mechanisms may be applied to one or more of an input unit and an output unit in any of the processing layers. In embodiments, the balancing mechanisms may be applied differently for an input unit than an output unit and may be applied differently for each processing layer. In some embodiments, the output part of balancing may be implemented as described herein to reduce the rate of connection growth in units having high total connection output. For each middle layer unit, increments of change in the strength of outgoing connections may result from reward-modulated signals that are divided by the ratio of the current sum of connection outputs to the initial sum of connection outputs of the same units.

Connection strength balancing may maintain the total connection strength of all incoming connections to an individual unit. For example, when a single input changes in strength, all other incoming connections of that unit may be adjusted to compensate for these changes. In embodiments, a total connections strength may be maintained across a given layer.

Firing rate balancing may maintain an average target firing rate of units. For example, when the actual firing rate is below the target rate, efficacy of all excitatory input signals may be scaled up in small steps toward the target firing rate. Some embodiments may change the target firing rate of the units within each layer to control the sparseness of activity within that layer. For example, lower firing rates and sparse activity in the middle layer may improve performance. A higher firing rate in the output layer may also improve performance.

Inhibition may project inhibition connections and the total strength of inhibition connections may equal about the total strength of excitation connections. Inhibition may generate inhibitory connections to the same set of the post connection units they excited. This may provide feedforward inhibition between layers of units. The total strength of inhibitory connections from any given unit may be the same as the total of their excitatory connections. The inhibitory units may in turn project to excitatory units in the same layer. As inhibitory units are often more compact and have faster response times, this can result in the inhibition arriving to the post-connection excitatory units with a small delay compared to the excitation. In some embodiments, reciprocal inhibition may be used, for example, between output units.

Noise may allow for learning through chance. Noise may include random variability in decision making. Examples of this include enhanced input detection by means of stochastic resonance and probabilistic inference. Noise can help with performance of associative memories, smoothing the threshold for action potential signals, allowing rapid response time for units or propagation of firing rates across the model.

In one embodiment, an untrained model may not have any meaningful mapping between the input received by the model and the output; the output activity may be driven by a random initial weights configuration. Variability (e.g., noise) may cause an unexpected output for a given input. In some examples, when the model output resulted in element acquisition, a reward signal was sent. If a connection that was likely to be associated with a reward was able to surpass the strength of another connection of the same preconnection unit, noise in connections created instances where the "correct" output unit fired and the "incorrect" output unit did not, despite the incorrect output unit having a stronger incoming connection strength.

In one example, the model may be programmed to have about a 1% chance on every move to ignore any output and instead move in a random direction. This random variability may prevent infinite loops of the virtual agent's motion during the learning process. In embodiments, the chance of random movement may start at 0.5% and increase by 0.5% for each move in which no element is obtained. The value may be reset to its starting value whenever an element was collected or obtained. In embodiments, the rate of random motion may be gradually increased by 1% per move in which the agent does not obtain an element. It should be appreciated that other values and rates of change may be selected based on a given task or objective.

Other features of the model may include, for example, delaying reward and punishment-modulated signals, other time-based features, changing the number of hidden layers, etc.

In some embodiments, environment 100 may generate user input options for a user. The user input options may allow a user to select a value or create a rule. The user input options may be presented on a graphical user interface of server system 106 or electronic device 102. The user may select a value or create a rule via the graphical user interface. Electronic device 102 may receive the user input and incorporate the user input into the model.

As shown in FIG. 1A, environment 100 may include one or more of electronic device 102 and server system 106. Electronic device 102 can be coupled to server system 106 via communication media 104. As will be described in detail herein, electronic device 102 and/or server system 106 may exchange communications signals, user input, the model, balancing mechanisms, reward-modulated signals, punishment-modulated signals, noise, metadata, and/or other information for electronic device 102 via communication media 104.

Electronic device 102 may include a variety of electronic computing devices, such as, for example, a smartphone, tablet, laptop, wearable device, and similar devices. In embodiments, electronic device 102 may be a computing device capable of movement, such as, for example, an unmanned rover, drone, etc. Here, electronic device 102 may perform such functions as accepting and/or receiving user input, displaying an agent in a virtual environment on a graphical user interface, moving in a real-world environment controlled by the model, etc. The graphical user interface may be provided by various operating systems known in the art, such as, for example, iOS, Android, Windows Mobile, Windows, Mac OS, Chrome OS, Linux, Unix, a gaming platform OS (e.g., Xbox, PlayStation, Wii), and/or other operating systems.

In various embodiments, communication media 104 may be based on one or more wireless communication protocols such as Bluetooth®, ZigBee, 802.11 protocols, Infrared (IR), Radio Frequency (RF), 2G, 3G, 4G, 5G, and/or wired protocols and media. Communication media 104 may be implemented as a single medium in some cases.

As mentioned, electronic device 102 may take a variety of forms, such as a desktop or laptop computer, a smartphone, a tablet, a smartwatch or other wearable electronic device, a television or other audio or visual entertainment device or system, a camera (including still shot or video) or the like. Electronic device 102 may communicate with other devices and/or with one another over communication media 104 with or without the use of server system 106. In various embodiments, electronic device 102 and/or server system 106 may be used to perform various processes described herein and/or may be used to execute various operations described herein with regard to one or more disclosed systems and methods. Upon studying the present disclosure, it will be appreciated that environment 100 may include multiple electronic devices 102, communication media 104, server systems 106, servers 108, processors 112, and/or storage 110.

As mentioned, communication media 104 may be used to connect or communicatively couple electronic device 102 and/or server system 106 to one another or to a network, and communication media 104 may be implemented in a variety of forms. For example, communication media 104 may include an Internet connection, such as a local area network (LAN), a wide area network (WAN), a fiber optic network, internet over power lines, a hard-wired connection (e.g., a bus), and the like, or any other kind of network connection. Communication media 104 may be implemented using any combination of routers, cables, modems, switches, fiber optics, wires, radio (e.g., microwave/RF links), and the like. Further, communication media 104 may be implemented using various wireless standards, such as Bluetooth, Wi-Fi, 3GPP standards (e.g., 2G GSM/GPRS/EDGE, 3G UMTS/CDMA2000, 4G LTE/LTE-U/LTE-A, 5G). Upon reading the present disclosure, it will be appreciated that there are other ways to implement communication media 104 for communications purposes.

Likewise, though not shown, it will be appreciated that a similar communication medium may be used to connect or communicatively couple server 108, processors 112, and/or storage 110 to one another, in addition to other elements of environment 100. In example embodiments, communication media 104 may be, or include, a wired or wireless wide area network (e.g., cellular, fiber, and/or circuit-switched connection) for electronic device 102 and/or server system 106, which may be relatively geographically disparate; and in some cases, aspects of communication media 104 may involve a wired or wireless local area network (e.g., Wi-Fi, Bluetooth, unlicensed wireless connection, USB, HDMI, and/or standard AV), which may be used to communicatively couple aspects of environment 100 that may be relatively close, geographically. In some embodiments, server system 106 may be remote from electronic device 102.

Server system 106 may provide, receive, collect, or monitor information from electronic device 102, such as, for example, user input, the model, balancing mechanisms, reward-modulated signals, punishment-modulated signals, noise, metadata, and the like. Server system 106 may be configured to receive or send such information via communication media 104. This information may be stored in storage 110 and may be processed using processors 112. For example, processors 112 may include an analytics engine capable of performing analytics on information that server system 106 has collected, received, or otherwise interacted with, from electronic device 102. In embodiments, server 108, storage 110, and processors 112 may be implemented as a distributed computing network or as a relational database or the like.

Server 108 may include, for example, an Internet server, a router, a desktop or laptop computer, a smartphone, a tablet, a processor, a component, or the like, and may be implemented in various forms, including, for example, an integrated circuit or collection thereof, a printed circuit board or collection thereof, or in a discrete housing/package/rack or multiple of the same.

In embodiments, server 108 directs communications for electronic device 102 over communication media 104. For example, server 108 may process and exchange messages for electronic device 102 that correspond to user input, the model, balancing mechanisms, reward-modulated signals, punishment-modulated signals, noise, metadata, and/or other information. Server 108 may update information stored on electronic device 102, for example, by delivering user input, the model, balancing mechanisms, reward-modulated signals, punishment-modulated signals, noise, metadata, and/or other information thereto. Server 108 may send/receive information to/from electronic device 102 in real time or sporadically. Further, server 108 may implement cloud computing capabilities for electronic device 102.

Figure 1B:
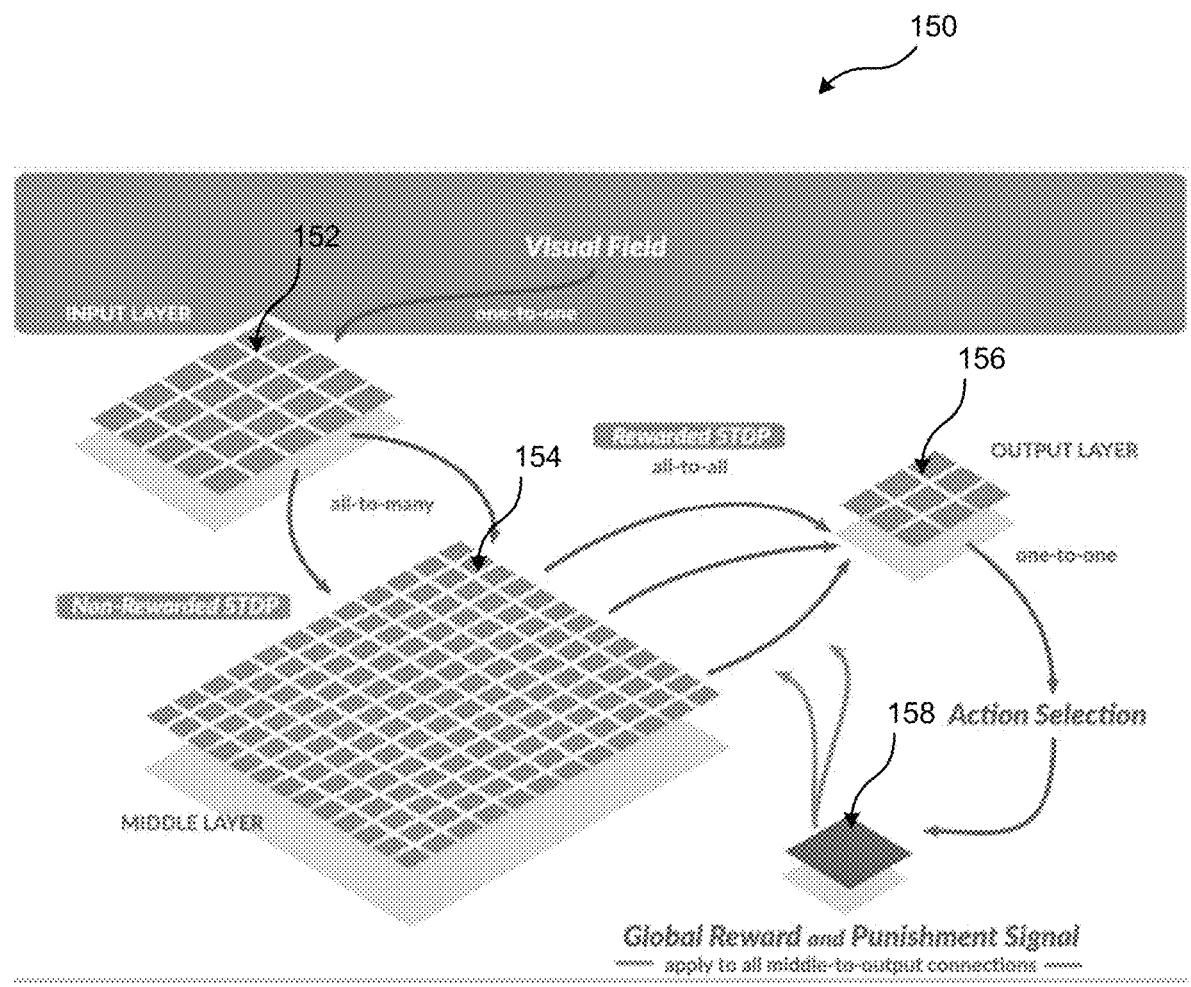
FIG. 1B illustrates a model for decision making including two layers of connections including a reward-modulated signal, in accordance with various embodiments of the present disclosure.

FIG. 1B illustrates a model for decision making including two layers of connections and a reward-modulated signal, in accordance with various embodiments of the present disclosure. In some embodiments, model 150 may include a punishment-modulated signal. In some embodiments, model 150 may include three feed forward layers to mimic a basic biological circuit: a 7×7 input layer 152, a 28×28 middle layer 154, a 3×3 output layer 156, and an action selection layer 158.

The connections from input layer 152 to middle layer 154 include a one-to-many connection and the connections from middle layer 154 to output layer 156 include an all to all connection. Each middle layer unit may receive inputs from a few randomly selected inputs from input layer 152. Reducing the number of inputs to each middle layer unit can greatly reduce the computational power required for the simulation. An untrained model may have random connections between all three layers, and as such any correlation between the input pattern and the model response may also be random.

Each input layer unit may send one excitatory and one inhibitory connection to each of the units in middle layer 154. Connections from input layer 152 to middle layer 154 may be affected by the non-reward-modulated signal. This form of unsupervised learning may allow model 150 to respond more readily to the common features (such as spatial patterns of the elements), and common combinations of features within the environment. Each middle layer unit may send one excitatory and one inhibitory connection to units in output layer 156. Signals from middle layer 154 to output layer 156 may be modulated by the reward signal.

Model 150 may be trained over time based on a given objective. One example objective, which may be used throughout, may be to train an agent to acquire or collect elements in a virtual environment. The environment may be a 50 by 50 grid with elements randomly distributed throughout it. In some embodiments, initially, each location may either be assigned or not be assigned an element. When an element is acquired as a result of the virtual agent move, it may then be assigned randomly to a new spot on the map. This results in a continuously changing environment with the same element density. In further embodiments, the density of elements in the environment may be set to 10%.

The virtual agent may then see a 7 by 7 grid of squares the ("visual field") centered on its current location and it can move to any adjacent square including diagonally for a total of 8 directions.

The input layer of model 150 may receive excitation to the units corresponding to the location of nearby elements (the agent's visual field). The middle (hidden) layer may receive connections from the input layer and may send reward-modulated signals to the output layer. In one example, the reward-modulated signal may be based on whether or not a move of an agent in an environment results in element acquisition or collection. The output layer may control the agent's direction of movement.

After training (e.g., for element collection with a horizontal preference), middle layer units may learn to respond when a specific pair of input layer units fire together. In embodiments, co-occurring pairs of signals may develop more representation in the middle layer than singular signals. In some embodiments, the maximum number of input units from the input layer to the middle layer may be about 9. It should be appreciated that other maximum values may be used for the input layer to the middle layer or other connections.

The most active unit in output layer 156 may decide the direction of subsequent movement. The magnitude of the effect of stored signals may decline with time causing older stored signals to have less impact on a connection if a reward-modulated signal is applied later. Multiple balancing mechanisms may be used to maintain efficiency of the trained model. Continuing the example above, after training model 150, model 150 may be able to move toward concentrations of elements and discriminate between reward-modulated elements and non-reward-modulated elements based on the spatial arrangement of the elements.

In one example, simulation time for the agent was divided up into epochs of 600 time steps, each roughly equivalent to 300 ms. At the start of each epoch, the virtual agent received input corresponding to locations of elements within input layer 152. Thus 48 of the 49 units receive input from a unique position relative to the virtual agent location. At the end of the epoch the virtual agent made one move based on the activity of the output layer. If the virtual agent moved to a grid square with an element, the element was removed from that square to a randomly selected new square.

Continuing the example, each epoch was of sufficient duration for the model to receive inputs, produce outputs, and return to a resting state. Input units may receive excitation on the first time step of each epoch. Output was chosen and the virtual agent moved at the end of the epoch. The activity of the output layer of the model controlled direction of virtual agent's movement. Each of the output layer units was mapped to a direction. The output layer unit that received the greatest number of signals during the first half of an epoch defined the direction of movement on that epoch. If there was a tie, a direction was chosen randomly from the tied outputs. If no units in the output layer fired, the virtual agent continued in the direction it traveled during the previous epoch.

To provide further detail of model 150, the following equations and examples may be used to describe one embodiment of model 150. Each unit in middle layer 154 may receive connection input signals from 9 random units in the input layer. Initially, these connections may have random strengths drawn from a normal distribution. Each unit in the excitatory middle layer may be connected to every unit in the output layer with a connection strength. All these connections may have uniform strengths and the responses in the output layer may be due to random variability. Random variability may be implemented as variability in the magnitude of each individual signal.

A signal in an outer layer unit that directly followed a signal in a middle layer unit may create a "pre before post" event. Each new post-connection unit signal may be compared to all pre-connection signals within the time window and each new pre-connection signal may be compared to all post-connection signals within the window. The value of a signal, represented by $v_E$, may be calculated using the following equation:

$$p = \frac{-|t_r - t_p|}{T_c}, \quad (1)$$

$$v_E = Ske^p,$$

where k is equal to about −0.05 in the case of a post before pre event and about 0.05 in the case of a pre before post event. The variable S is the strength of the connection, $t_r$ and $t_p$ are the times at which the pre- and post-connection signals occurred respectively, and $T_c$ is the time constant that is equal to about 40 ms. It should be appreciated that the value may be calculated using a different equation and constants, based on a given task or objective.

The signals may be immediately applied to their respective connection. In contrast, for connections from middle layer units and outer layer units, the signals may be stored for later use. Each signal may remain stored for about 5 epochs after its creation and may then be erased. It should be appreciated that the time frame a signal is store and erased may vary based on a given task or objective. While stored, the signal may have an effect whenever there is a rewarding or punishing decision. If the model is rewarded or punished, the new connection strength S of the connection $W_{ij}$ may be described as:

$$S(n+1) = S(n) \prod_k^{traces} \left(1 + \frac{W_{in}}{W_i} + \Delta_k\right), \quad (2)$$

$$\Delta_k = S_{rp} \cdot \frac{tr_k}{t - t_k + c} \cdot \frac{\text{Sum}_{tr}(n+1)}{\text{Avg}_{tr}(n+1)},$$

$$\text{Sum}_{tr}(n+1) = \sum_k^{traces} \frac{tr_k}{t - t_k + c},$$

$$\text{Avg}_{tr}(n+1) = Avg(n)(1 - \delta) + \delta \text{Sum}_{tr}(n+1),$$

where t is current time step, $S_{rp}$ is a scaling factor for reward/punishment, $t_{rk}$ is magnitude of trace (=$ke^p$ in equation (1)), $t_k$ is time of the signal, c is a constant (about 1 epoch) used for decreasing sensitivity to very recent signals, $W_i = E_j W_{ij}$ is a total connection strength of all connections from specific unit Hi to all units $O_j$ of the output layer, $W_{io}$ is a constant that is set to the value of $W_i$ at the at the beginning of the simulation, or a target value. In embodiments, negative and positive signals may be analyzed separately. It should be appreciated that the connection strength may be calculated using a different equation and constants, based on a given task or objective.

Using the collection example above, the model may be rewarded when the virtual agent moves to an element location and $S_{rp}$ is about 1. In the case of pattern recognition, the model may be punished when it moves to a location with a non-rewarding element and $S_{rp}$ is about −0.5. There may also be smaller punishment applied when no element is collected. In embodiments, $S_{rp}$ may be about −0.1, about −0.01, or other values for different tasks. The effect of these rules may be that the units with lower total output strength increase their output strength more easily.

The model may incorporate connection scaling, which may take place every epoch (e.g., about 600 time steps). The total strength of connection signals $W_j = \Sigma_i W_j$ to a given output unit $O_j$ may be set to be approximately equal, at each time step, to the target connection input signal $W_j = W_{jo}$. If a unit $O_j$ consistently fired below the target rate, the $W_{jo}$ may be increased by $D_{tar}$ at about 0.0001. If the unit responded above its target firing rate the $W_{jo}$ may be gradually reduced:

$$W_{j(n+1)} = \begin{cases} W_{j(n)} * (1 + D_{tar}) & \text{spike rate} < \text{target rate} \\ W_{j(n)} * (1 - D_{tar}) & \text{spike rate} > \text{target rate} \end{cases} \quad (3)$$

To ensure that total connection input $W_j$ remains unaffected by signals of individual connections at individual time steps and equal to $W_{jo}$, a scaling process may be implemented that occurs after each signal. When any excitatory connection increases in strength, all the other excitatory connections incoming to that unit may decrease in strength by a scale factor $S_f$ to keep $W_j = W_{jo}$:

$$W_{ij(n+1)} = W_{ijn} S_f \quad (4)$$
$$S_f = \frac{W_{j0}}{\sum_i W_{ijn}}$$

where $W_{ijn}$ are connection weights right after signal but before scaling, and $W_{ij}$ (n+1) are connection weights after scaling, where $W_{j0}$ is $W_{iO}$ from equation (2).

The underlying reduced model of fast spiking unit may be described by the following difference equations:

$$V_{n+1} = f_\alpha(V_n, I_n + \beta_n).$$

$$I_{n+1} = I_n - \mu(V_n + 1) + \mu\sigma + \mu\sigma_n. \quad (5)$$

where $V_n$ is the membrane voltage, $I_n$ is a slow dynamical variable describing the effects of slow conductance, and n is a discrete time step (e.g., about 0.5 msec). Slow temporal evolution of $I_n$ may be achieved by using small values (e.g., less than 1). Input variables $\beta_n$ and $I_n$ may be used to incorporate external current $I_{ext}$ (e.g., connection input): $\beta_n = \beta_e I_{ext}$. Parameter values may also be set to a is about 0.06, $\beta_n$ is about 0.133, and $\mu$ is about 0.0005. It should be appreciated that the connection strength may be calculated using a different equation and constants, based on a given task or objective. The nonlinearity may be designed in the form of a piece-wise continuous function:

$$f_\alpha(V_n, I_n) = \begin{cases} \alpha(1 - V_n)^{-1} + I_n, & V_n \leq 0 \\ \alpha + I_n, & 0 < V_n < \alpha + I_n \& V_{n-1} \leq 0 \\ -1, & \alpha + I_n \leq V_n \text{ or } V_{n-1} > 0 \end{cases} \quad (6)$$

where $\alpha$ is about 3.65. To convert the dimensionless V to potential $V_{ph}$, the following equation may be applied: $V_{ph} = 50V - 15$ [mV]. It should be appreciated that the nonlinearity and conversion may be calculated using a different equation and constants, based on a given task or objective.

To simulate interconnections, first order kinetic models of connection conductances may be rewritten in the form of difference equations:

$$g^{syn}_{(n+1)} = \gamma g^{syn}_n + \begin{cases} (1 + XR)g_{syn}, & spike_{pre}, \\ 0, & \text{otherwise} \end{cases} \quad (7)$$

where the connection current is computed as $I_n^{syn} = -g_n^{syn} (V_n^{post} - V_{rp})$.

Here $g_{syn}$ is the strength of a connection, and indices pre and post stand for the preconnection and postconnection variables, respectively. The first condition, "$spike_{pre}$", may be satisfied when preconnection signals are generated. Parameter $\gamma$ controls the relaxation rate of connection conductance after a preconnection signal is received, where $\gamma$ may be greater or equal to zero and less than one. The parameter R is the coefficient of variability in connection release. The standard value of R may be 0.16. X may be a randomly generated number between −1 and 1. Parameter $V_{rp}$ defines the reversal potential and, therefore, the type of connection: excitatory or inhibitory. The term (1+XR) introduces a variability in connection release such that the effect of any connection interaction has an amplitude that is pulled from a flat distribution ranging from 1+R to 1−R times the average value of the connection. It should be appreciated that the connection conductances and connection current may be calculated using a different equation and constants, based on a given task or objective.

Figure 2:
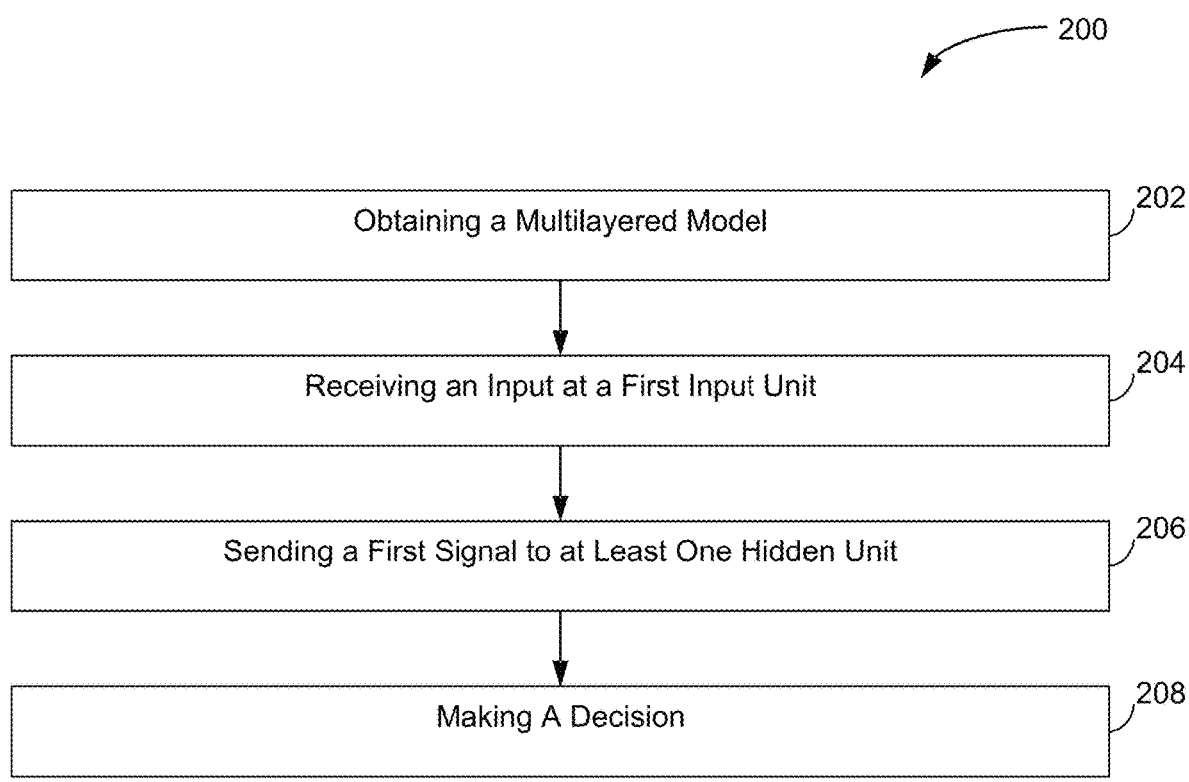
FIG. 2 illustrates a flow diagram depicting various operations of a method for decision making based on changing connectivity between units, in accordance with aspects of the present disclosure.

FIG. 2 illustrates a flow diagram depicting various operations of method 200, and accompanying embodiments for decision making based on changing connectivity between units, in accordance with aspects of the present disclosure. The operations of the various methods described herein are not necessarily limited to the order described or shown in the figures, and it will be appreciated, upon studying the present disclosure, variations of the order of the operations described herein that are within the spirit and scope of the disclosure.

The operations and sub-operations of method 200 may be carried out, in some cases, by one or more of the components, elements, devices, and circuitry of environments 100, electronic device 102, communication media 104, server system 106, server 108, processor 112, model 150, model 900, and/or computing component 1200, described herein and referenced with respect to at least FIGS. 1A, 1B, 9, and 12, as well as sub-components, elements, devices, and circuitry depicted therein and/or described with respect thereto. In such instances, the description of methods 200 may refer to a corresponding component, element, etc., but regardless of whether an explicit reference is made, it will be appreciated, upon studying the present disclosure, when the corresponding component, element, etc. may be used. Further, it will be appreciated that such references do not necessarily limit the described methods to the particular component, element, etc. referred to. Thus, it will be appreciated that aspects and features described above in connection with (sub-) components, elements, devices, circuitry, etc., including variations thereof, may be applied to the various operations described in connection with methods 200 without departing from the scope of the present disclosure.

At operation 202, method 200 includes obtaining a multilayered model. The multilayered model may include an input layer including one or more input units. The multilayered model may include one or more hidden layers, each hidden layer including one or more hidden units. The multilayered model may include an output layer including one or more output units. The multilayered model may include one or more features to improve the performance of the multilayered model, as described above.

At operation 204, method 200 includes receiving an input at a first input unit. The input may be the visual field of a virtual agent, the visual field of a real-world agent, or any other inputs.

At operation 206, method 200 includes sending a first signal from the first input unit to at least one of the one or more hidden units on a first hidden layer via a first connection including a first strength. The first input unit may also have a strength associated with the signal, as described herein. The strength of the first connection may change over time, as described herein. For example, if the first connection is highly active, the strength of the connection may be normalized based on the average strength of the connection over a period of time.

At operation 208, method 200 includes making a decision based on the model receiving the input. The decision will be based on the task assigned to the model. The decision may be based on one or more of the output units. An output unit may be selected randomly based on the input. $I_n$ embodiments, signals sent through connections associated with an output unit that made a correct decision may be modulated by a reward signal. Signals sent through connections associated with an output unit that made a wrong decision may be modulated by a punishment signal, or may not be modulated at all.

Figure 3B:
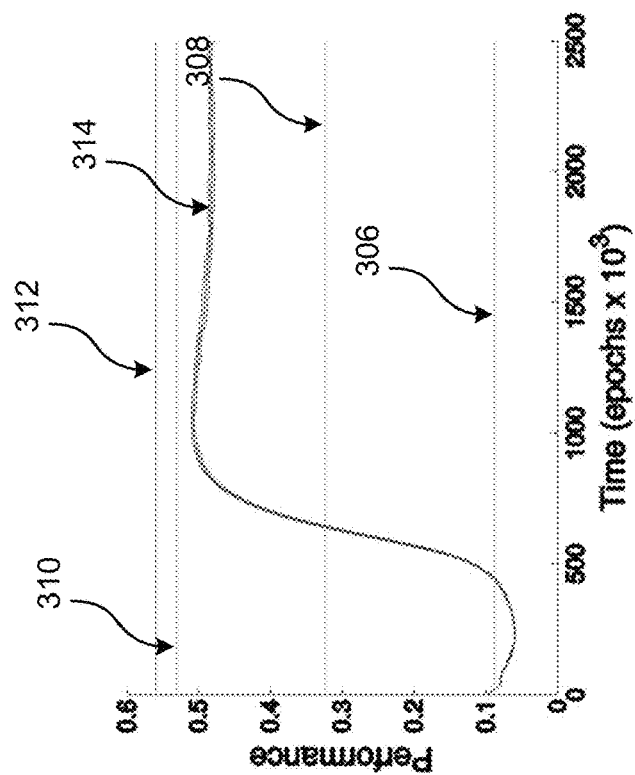
FIG. 3B illustrates a graph of the performance dynamics of a model over time without using normalization, in accordance with various embodiments of the present disclosure.
Figure 3A:
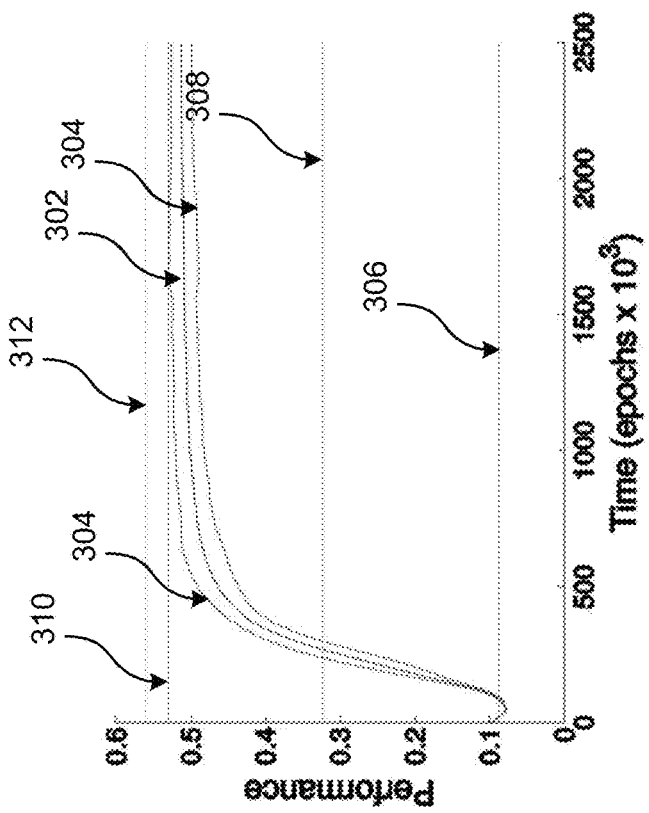
FIG. 3A illustrates a graph of the performance dynamics of a model over time, in accordance with various embodiments of the present disclosure.

FIGS. 3A-5B illustrate graphs depicting a performance example for an example model with at least two layers of connections, in accordance to various embodiments of the present disclosure. The graphs and depictions in FIGS. 3A-5B show the dynamics of a model for a simple collection task of element acquisition regardless of the spatial arrangement of the elements. Various mechanisms were applied in this model in order to obtain the best performance for a simple collection task of acquiring elements. More specifically, FIG. 3A illustrates a graph of the performance dynamics of the model over time, in accordance with various embodiments of the present disclosure. The Y axis is the rate of element acquisition per move as an exponential moving average. The X axis is time in epochs (in the illustrated example, each epoch consists of 600 time steps). In this example model, element acquisition rates often exceeded about 52%, and performance was reliable across multiple trials. Lines 302 represent the mean performance and lines 304 represent the standard deviation from the mean. FIG. 3B is a graph depicting a performance of the model without normalization. As a result, the slow decline in model performance may be completely eliminated and learning speed may be improved. Line 314 in the graph shows a decline in performance occurring after initial peak in all of the trials and over a wide range of testing parameters. Lines 306, 308, 310, and 312 in FIGS. 3A and 3B represent performance of different heuristic algorithms—line 306: random movement (98% go straight 3% turn); line 308: move to any element if directly adjacent; line 310: always move toward closest element; line 312: try all possible combinations within the agent's visual field and then take the first move of most successful set.

With respect to the heuristic algorithm corresponding to line 306, when no element is present in the visual field of the agent, the agent either continues in the same direction it moved on the last step with a probability of about 98% or turns at 45 degrees left or right with about a 2% probability.

$I_n$ comparison, when the elements were present, the agent searched through all possible combinations of 5 moves within the visual field. The agent then chose the set of moves that would result in the most elements being obtained and made the first move from that set. If multiple sets of moves obtained the same number of elements, the set that obtained an element sooner was selected. If multiple sets had the same sequence of elements being obtained, one of the sets was chosen randomly. Using a given density of elements in the environment, the model had an average element acquisition rate of about 55%.

Figure 4:
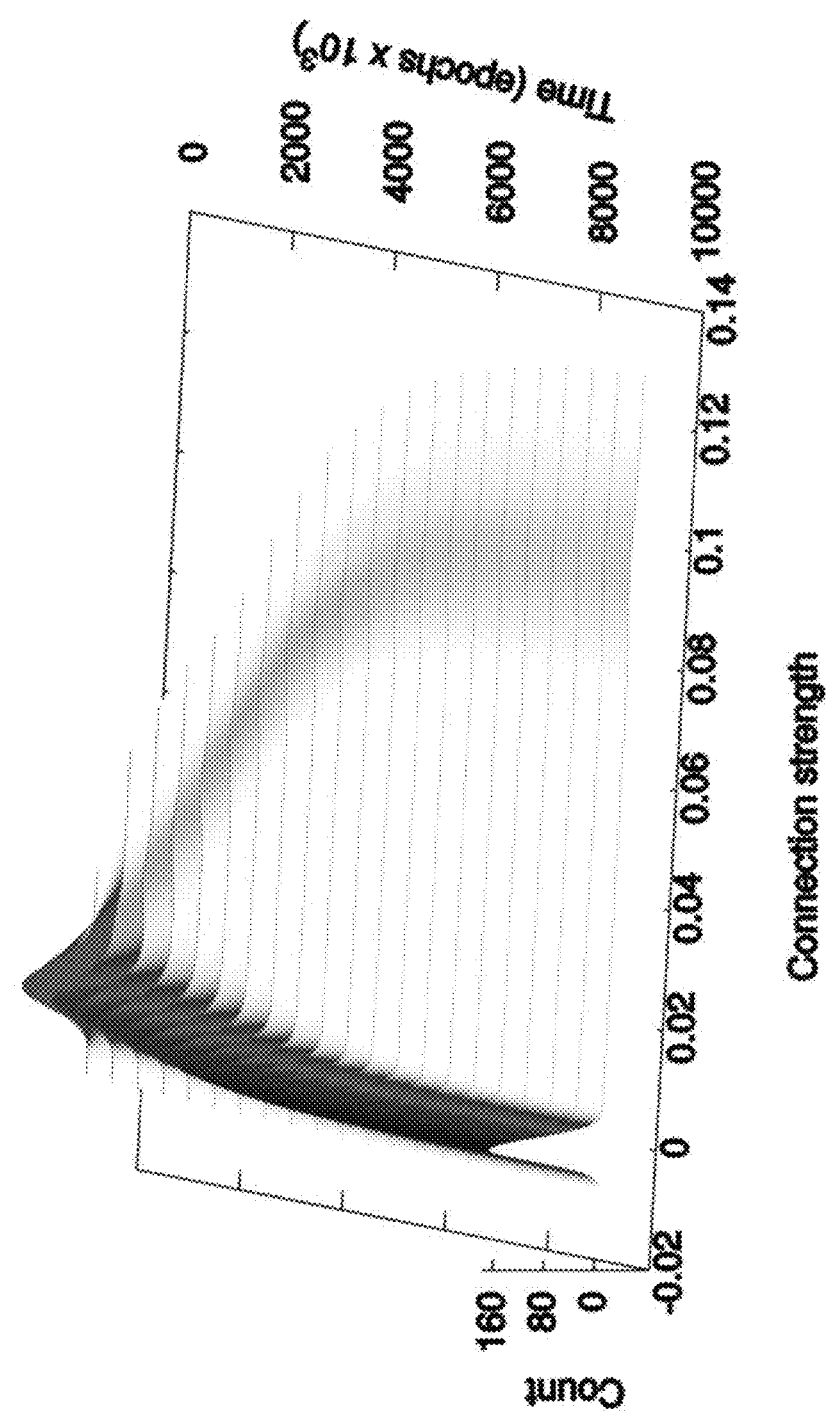
FIG. 4 illustrates a graph showing the time evolution of the strength of excitatory connections, in accordance with various embodiments of the present disclosure

FIG. 4 is a graph showing the time evolution of the strength of excitatory connections from the input to the middle during the first 10000 epochs (the profile at any point in time corresponds to the histogram of strengths), in accordance with various embodiments of the present disclosure. FIG. 4 shows dynamics of the strengths of excitatory connections from the input to the middle layer over time. As the model learned a task, a small fraction of connections increased and moved apart from the majority of other connections which were slightly reduced.

Figure 5B:
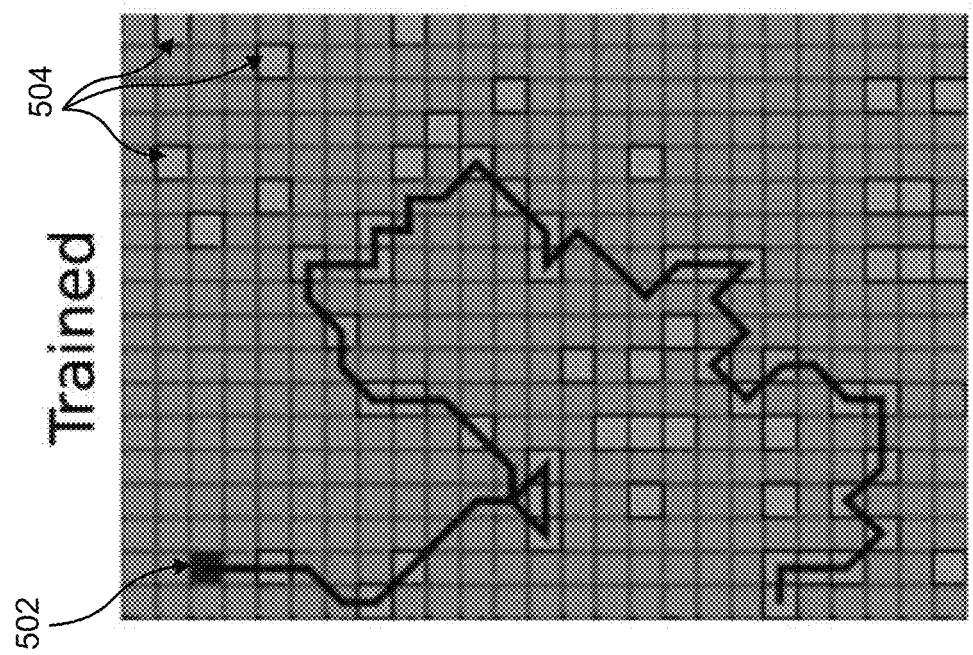
FIG. 5B illustrates agent movement through an environment using the model after training, in accordance with various embodiments of the present disclosure.
Figure 5A:
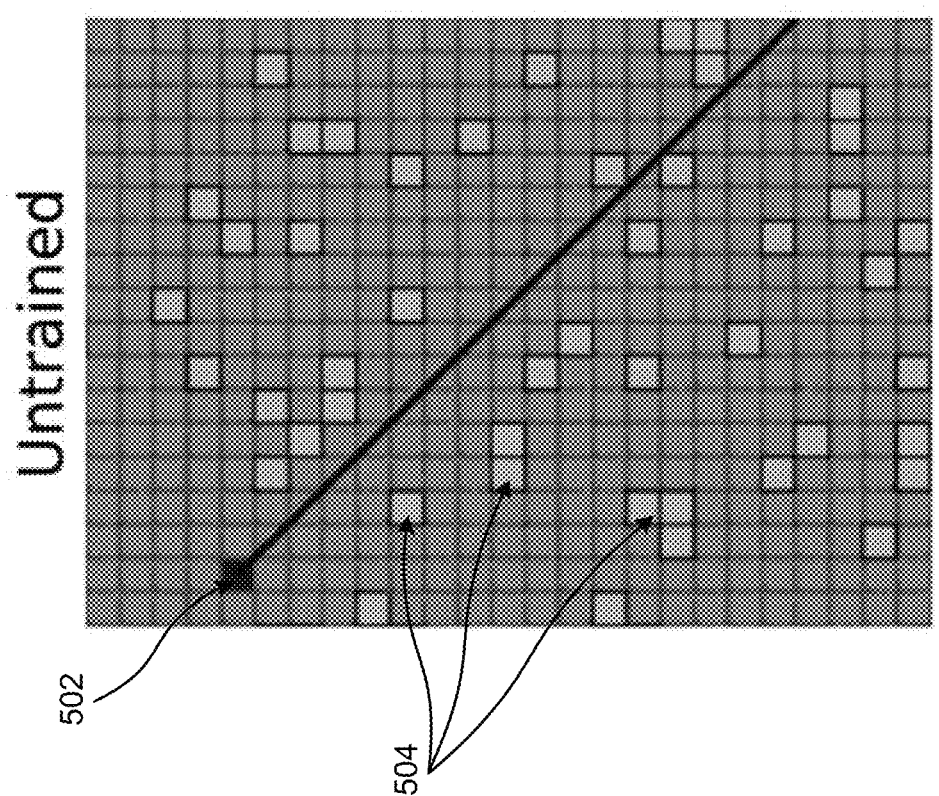
FIG. 5A illustrates agent movement through an environment using the model without training, in accordance with various embodiments of the present disclosure.

FIGS. 5A and 5B illustrate agent movement through the environment in this example. FIG. 5A depicts the agent before training. The agent follows a linear path to try and obtain as many elements 504 as possible. FIG. 5B depicts the agent after approximately 120×103 training steps where it is able to collect more elements 504. Dot 502 may represent a starting position of the agent in the environment.

Figures 5C, 5D:
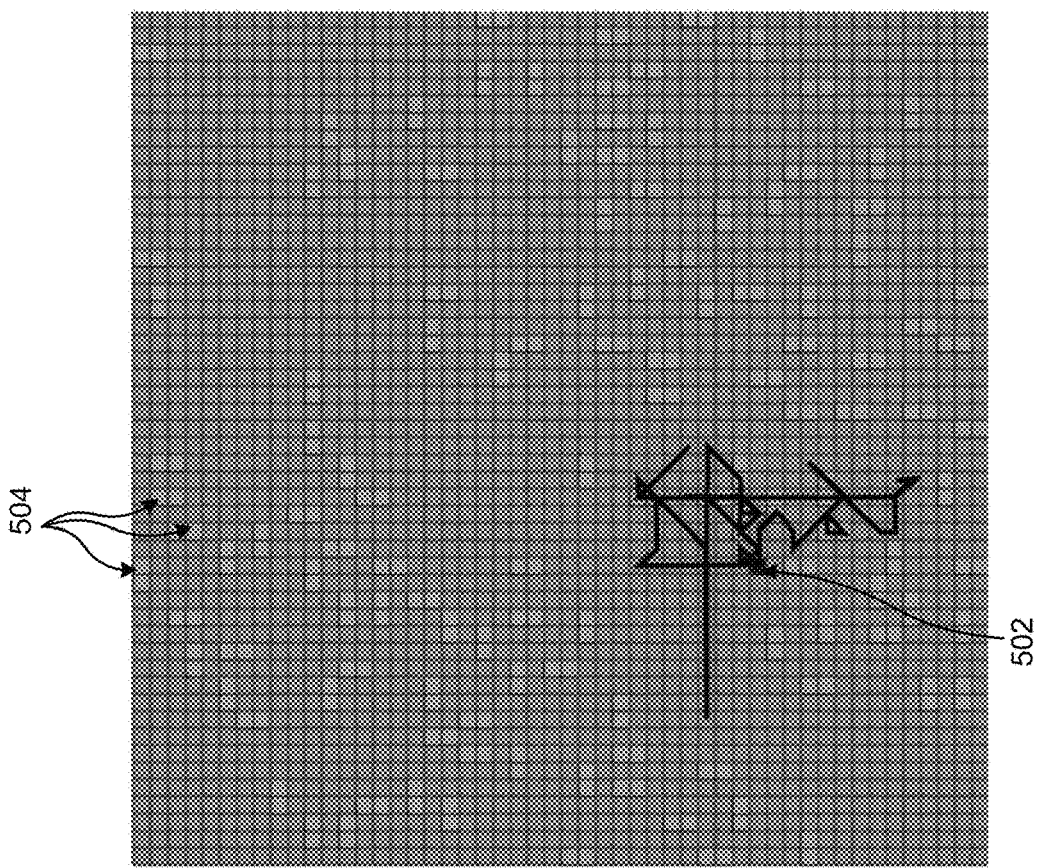
FIG. 5C illustrates agent movement through an environment using the model without training, in accordance with various embodiments of the present disclosure.
FIG. 5D illustrates agent movement through an environment using the model after training, in accordance with various embodiments of the present disclosure.

FIGS. 5C and 5D illustrate agent movement through an environment, in accordance with one embodiment. In these figures, the agent may be able to quickly learn avoiding vertical element arrangements and acquiring horizontal element arrangements. Dot 502 is the starting point of the agent, and the line represents its movement. More specifically, FIG. 5C depicts the agent's moving behavior before training and FIG. 5D depicts the agent's behavior after training. FIG. 5D illustrates the preference for horizontal element arrangements.

Figure 6:
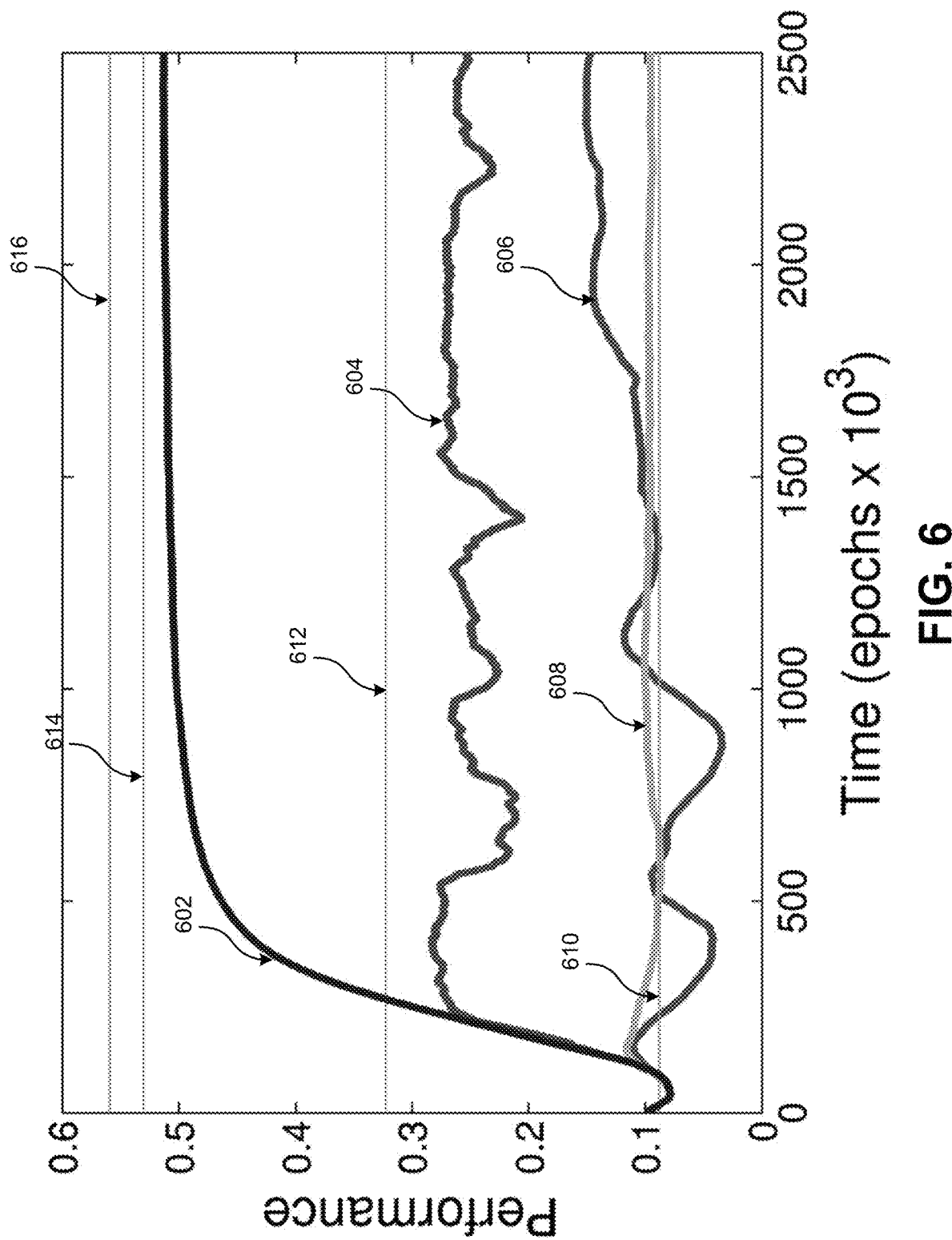
FIG. 6 illustrates the results of tests conducted to determine the impact of the different balancing mechanisms on the model, in accordance with various embodiments of the present disclosure.

FIG. 6 illustrates the results of tests conducted to determine the impact of the different balancing mechanisms on the model, in accordance with various embodiments of the present disclosure. The balancing mechanisms may include one or more of connection strength balancing, firing rate balancing, inhibitory balancing, and other balancing mechanisms, as described herein. As depicted in the figure, line 602 indicates a full model with input side connection strength balancing and output balancing. Line 604 indicates input side connection strength balancing that is implemented, but with no output balancing. Line 606 is a model with no input or output balancing. Instead, the sum of the all outgoing connection strengths was held constant. Line 606 may depict performance at near chance levels. Additionally, the distribution of connection weights became bimodal with a small number of connections reaching ceiling values. Line 608 indicates a model with no input side connection strength balancing, but output balancing is still implemented. Line 608 may fall to near chance levels as connection strengths diverge.

Figures 7A, 7B:
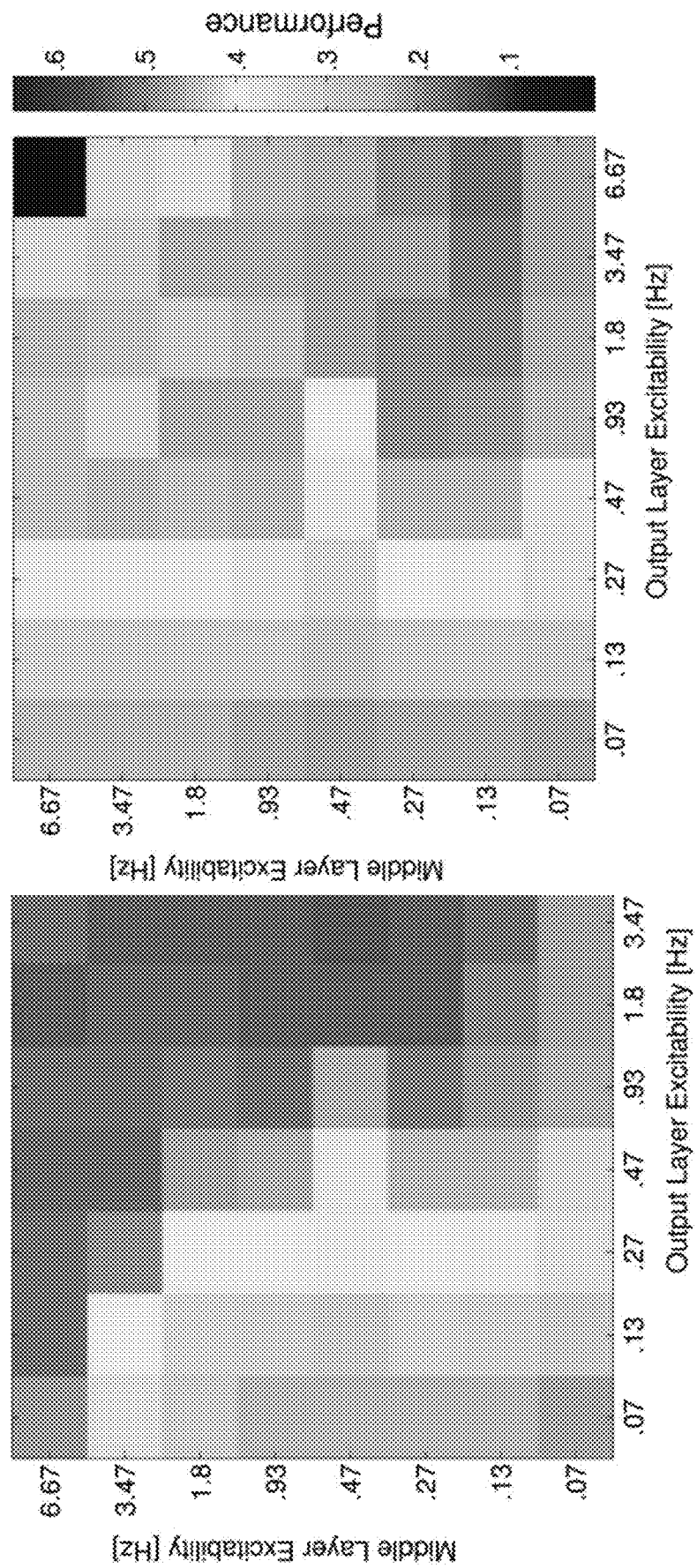
FIG. 7A illustrates a heat chart of peak performance under a range of target firing rates, in accordance with various embodiments of the present disclosure.
FIG. 7B illustrates a heat chart of final performance under a range of target firing rates, in accordance with various embodiments of the present disclosure.

FIGS. 7A and 7B illustrate the target firing rate of units set to different levels. FIG. 7A depicts a heat chart of peak performance under a range of target firing rates in the middle layer (y-axis) and the output layer (x-axis). FIG. 7B is a heat chart showing final performance over the same range of conditions. Points where large differences exist between the two heat charts generally indicate conditions where the model performed much better early in the simulation but decreased in performance over time.

For example, FIGS. 8A-8C may illustrate simulations in three models with different inhibitory connectivity. Referring to FIG. 8A depicts an example in which model performance was reduced when no inhibition was present in the model. FIG. 8B depicts the coefficient of variance in the middle layer, and FIG. 8C depicts the coefficient of variance in the output layer for the same sets of trials. The lines have the same meaning for all three figures: line 802 shows the baseline model, line 804 shows no inhibition from input to middle layer, line 806 shows no inhibition from middle to output, and line 808 shows no inhibition in both layers.

Line 804 reveals a moderate decline in performance in FIG. 8A. The other models performed at near chance levels for FIG. 8A. Inhibitory connections from the input to the middle layer were shown to be nonessential in the base model as indicated by line 808 in FIG. 8A.

Layers not receiving inhibitory input had far greater variance in their activity per epoch, as depicted in FIGS. 8B and 8C. Large variances in the output layer activity were associated with very poor performance. Eliminating inhibition only from the input to middle layers greatly increased the variance of activity in the middle layer but had far less impact on the final performance because activity in the output layer could still be constrained by feedforward inhibition to the output layer.

Figure 8D:
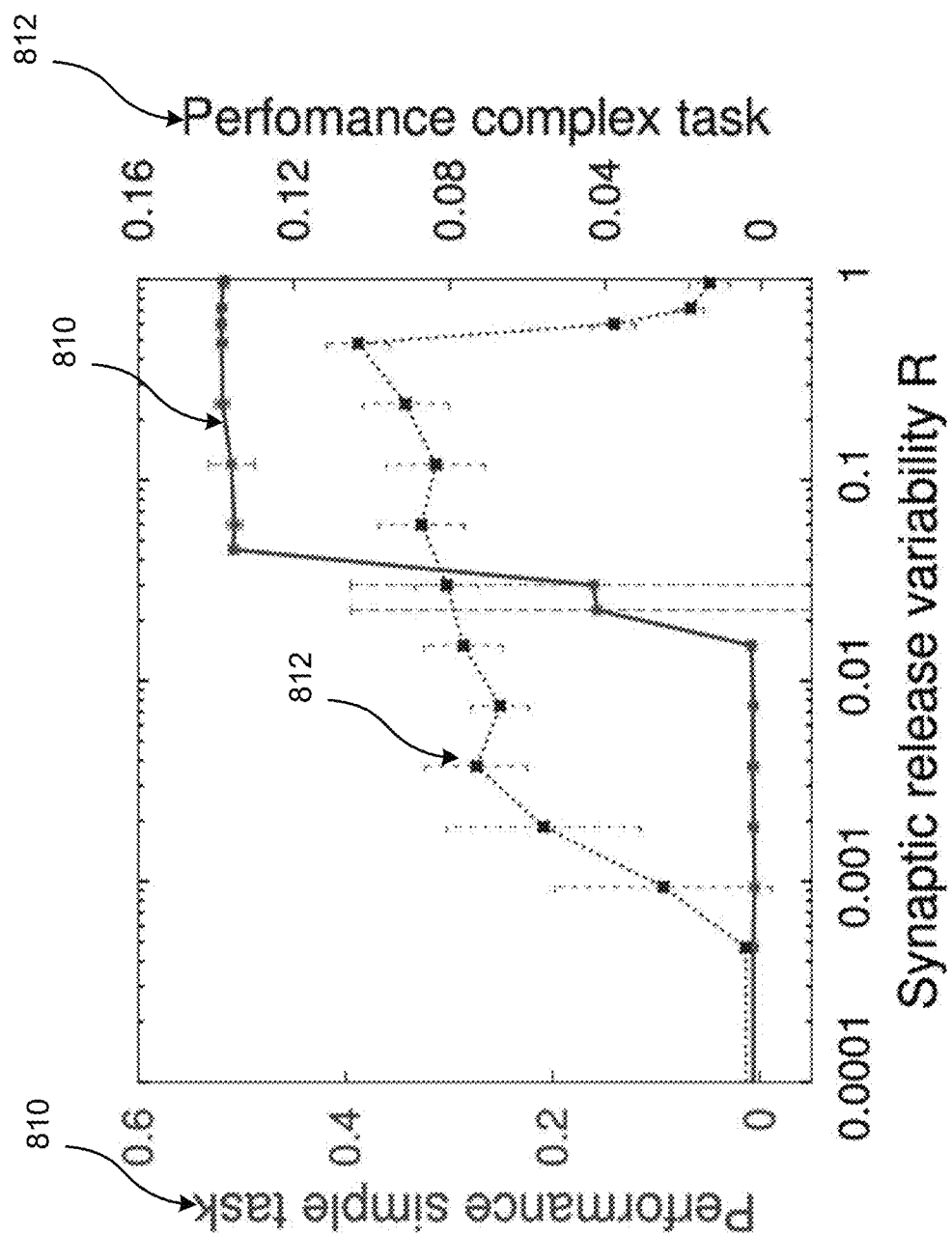
FIG. 8D illustrates performance for different levels of variability, in accordance with various embodiments of the present disclosure.

FIG. 8D illustrates performance for different levels of variability, in accordance with various embodiments of the present disclosure. The model included some level of randomness in all of its connections. Line 810 shows that the low noise amplitude prevented the model from learning successfully, while increasing the level of noise beyond a certain level led to an abrupt performance increase. Line 812 shows that for more complex tasks, a smoother transition occurs. Nonetheless, a certain level of noise was still required for our model to learn successfully.

Figure 9:
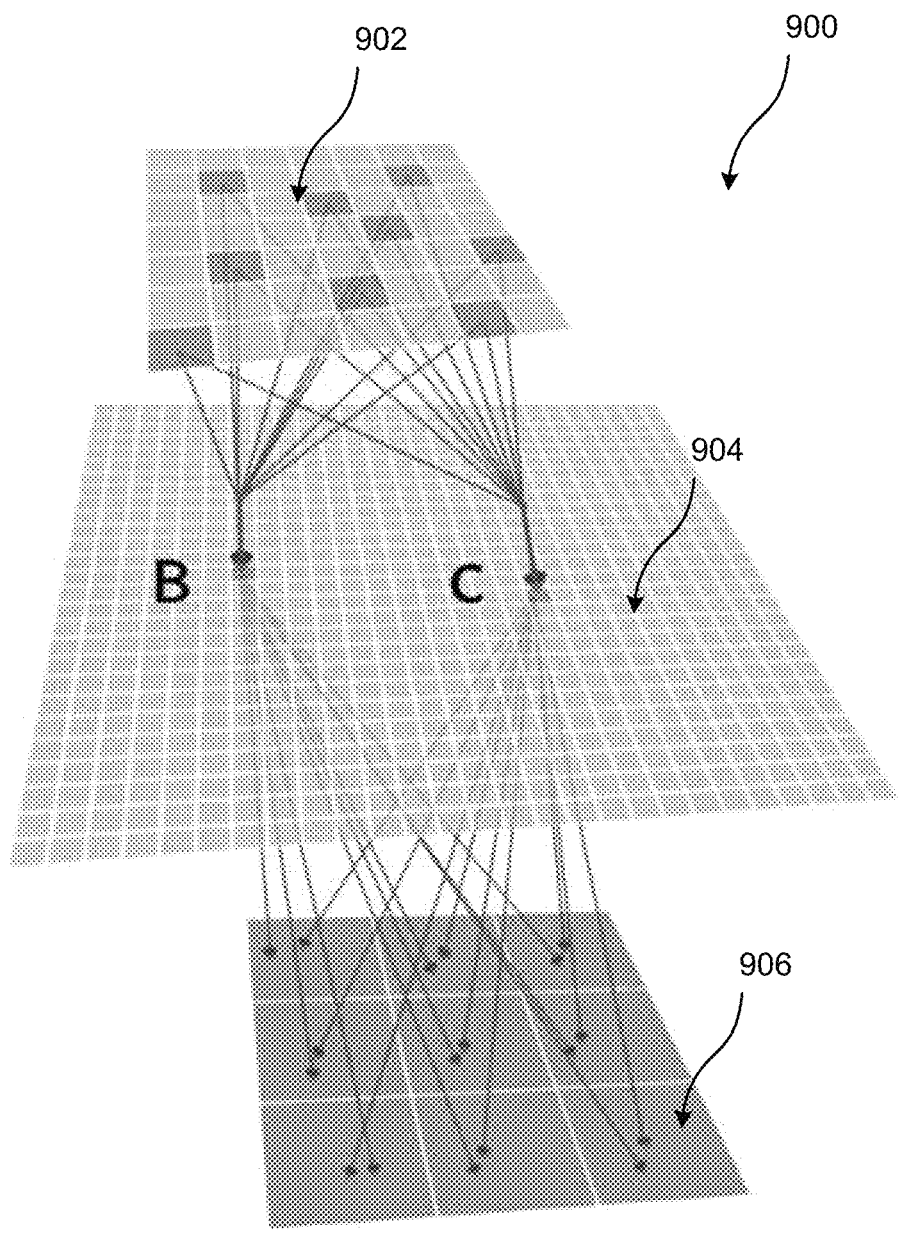
FIG. 9 illustrates a model with connections to two middle layer units, in accordance with various embodiments of the present disclosure.

FIG. 9 illustrates a model with connections to two middle layer units, in accordance with various embodiments of the present disclosure. On top is input layer 902 (visual field), below that is middle layer 904, and at the bottom is output layer 906 (direction of next movement). Points B and C illustrate the strengths of the connection inputs (left) and outputs (right) of two middle layer units after successful training. In embodiments, the model may be trained to move toward horizontal element pairs and away from vertical element pairs.

Figure 10D:
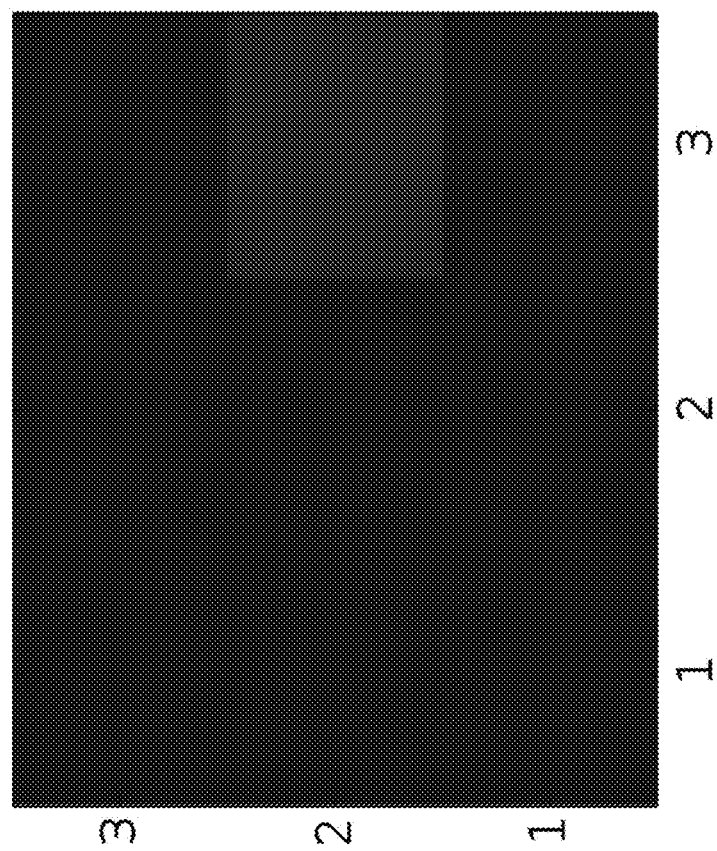
FIG. 10D illustrates an excited right output unit that directs movement away from the element pair.
Figure 10C:
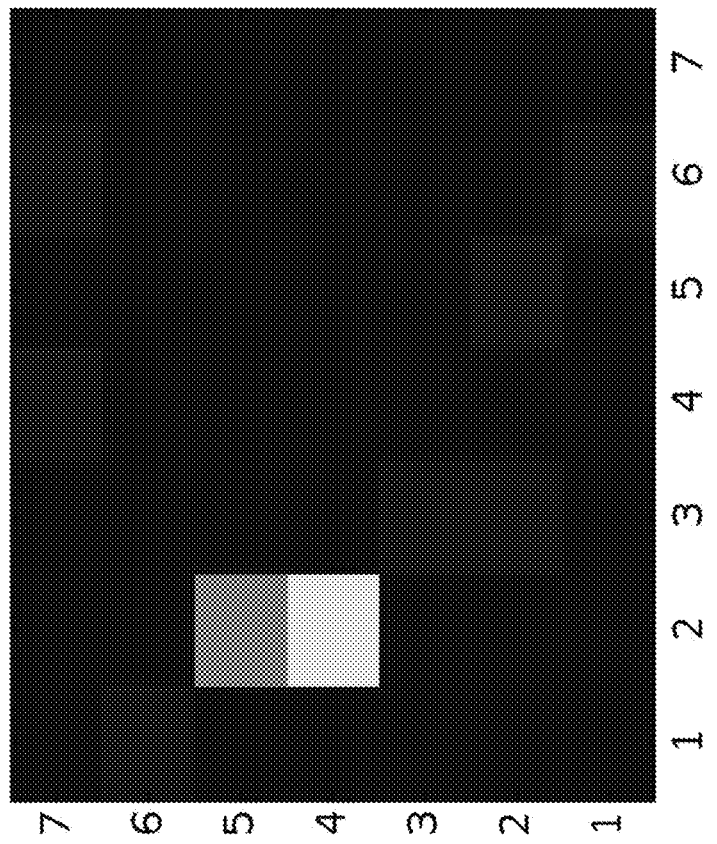
FIG. 10C illustrates a characteristic middle layer unit that has become responsive to a pair of vertically arranged inputs on the left of a visual field, in accordance with various embodiments of the present disclosure.

FIGS. 10A and 10B illustrate a characteristic middle layer unit that has become responsive to a pair of horizontally arranged inputs on the top right of the visual field and excites the top-right output unit which moves the virtual agent toward the element pair. FIGS. 10C and 10D illustrate a characteristic middle layer unit that has become responsive to a pair of vertically arranged inputs on the left of visual field. It has learned to excite the right-direction unit that directs movement away from the element pair.

Figure 11A:
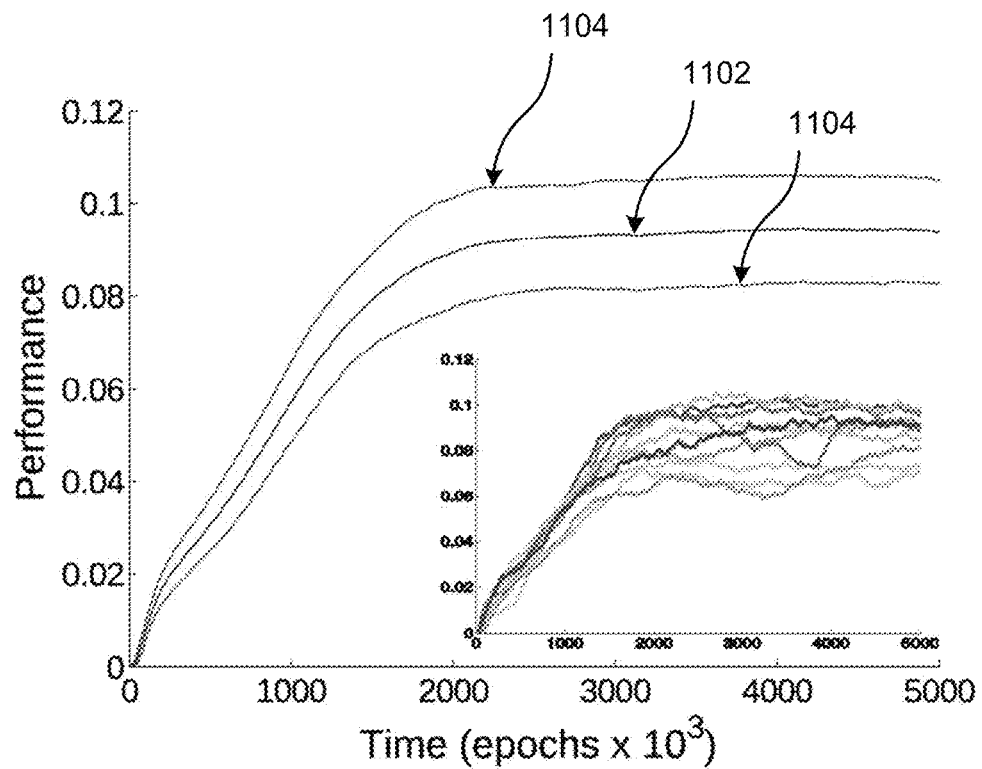
FIG. 11A illustrates a performance of a model requiring discrimination between the two element arrangements, in accordance with various embodiments of the present disclosure.

FIG. 11A shows dynamics of the performance for a task requiring the discrimination of stimuli between vertical and horizontal element pairs. Line 1102 represents the mean performance and lines 1104 represent the standard deviation from the mean. Performance may be lower than in the other simulations, (e.g., FIG. 3A) because of the lower overall element density and the avoidance of wrong elements. The performance and measurements were obtained for 10 example trials.

Figure 11B:
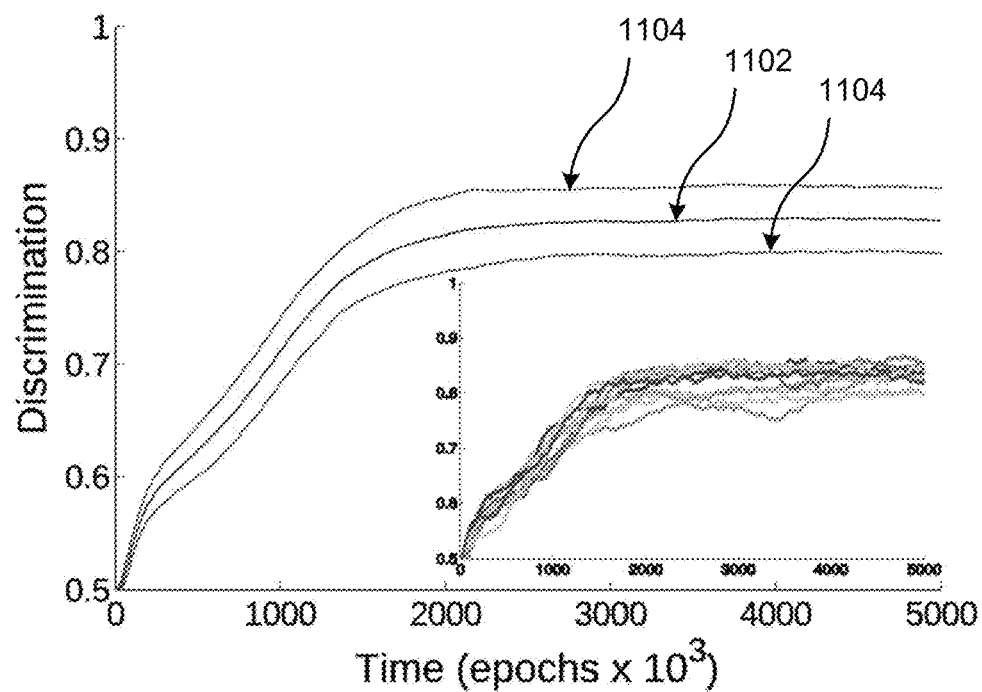
FIG. 11B illustrates the average rate of reward elements acquired as a percentage of the total rate of elements acquired, in accordance with various embodiments of the present disclosure.

In the simulation for FIG. 11A, the total density of reward elements in the new environment was 25% compared to the base model, where no compound shapes were used. Accuracy in discriminating between the two element arrangements was often above 80% with a high rate of element acquisition, as illustrated in FIG. 11B. FIG. 11B shows the average rate of reward elements acquired as a percentage of the total rate of elements acquired for the same set of trials as in FIG. 11A.

It should be noted that any of the described embodiments may be input in a system that may include one or more servers and one or more client computing platforms. A server may include one or more processors and one or more non-transitory memories with computer program instructions embedded thereon. The computer program instructions may include a user component with a machine learning tool to model artificial intelligence behavior based on neural networks employing STDP. A server may include a data store.

User component may receive input from client computing platform. For example, user component may cause processor to generate a graphical user interface, or other user interface for receiving user input from client computing platform. The user input may include modeling parameters, for example, as described with respect to the embodiments described above. Client computing platform(s) may include desktop computers, laptop computers, tablet computers, handheld computers, smart phones, or other computing platforms capable of operating a client interface.

As will be appreciated, the method as described herein may be performed using a computing system having machine executable instructions stored on a tangible medium. The instructions are executable to perform each portion of the method, either autonomously, or with the assistance of input from an operator.

Figure 12:
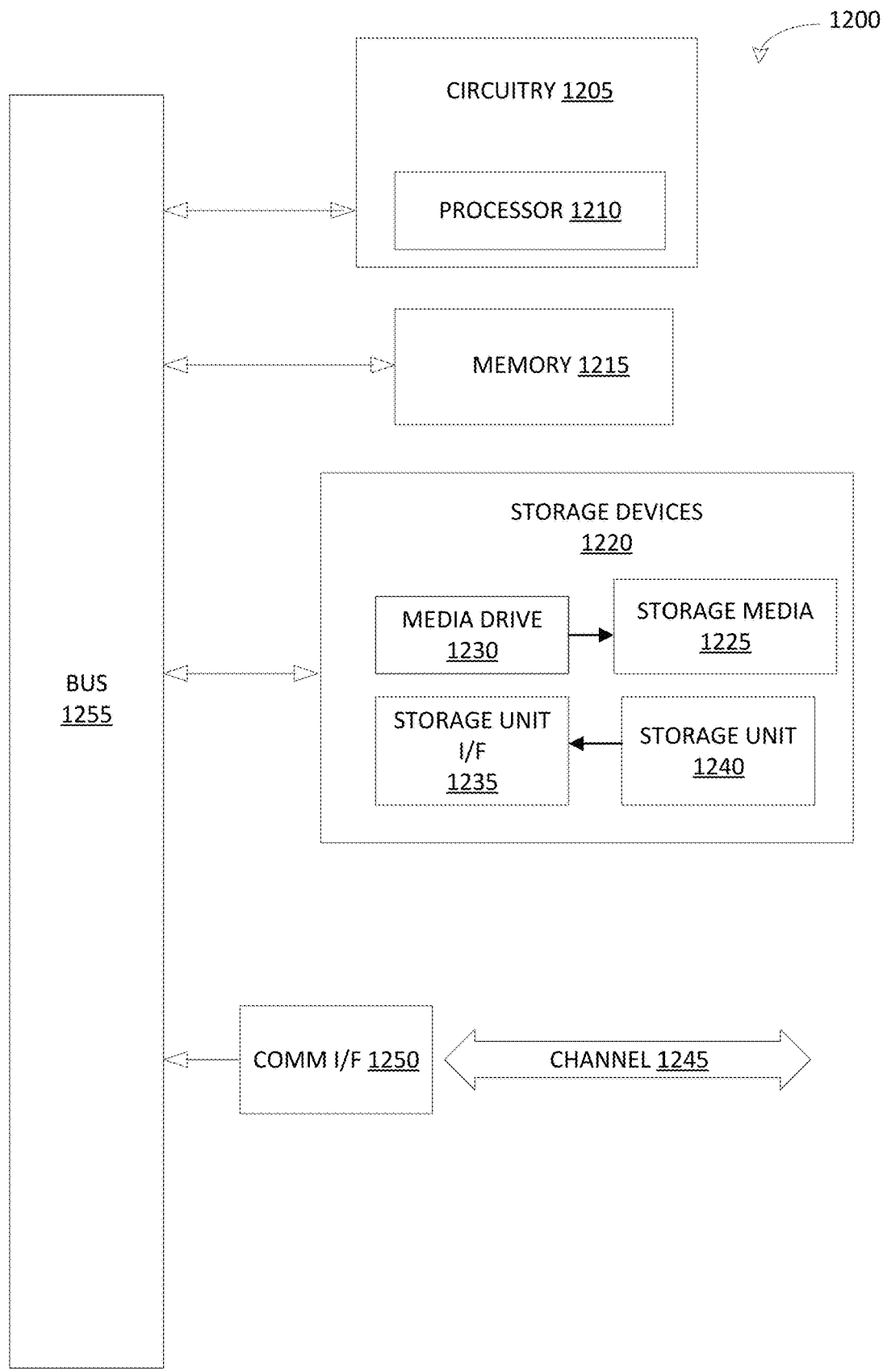
FIG. 12 is a diagram depicting an example computing component used to implement features according to certain embodiments of the provided disclosure.

FIG. 12 illustrates example computing component 1200, which may in some instances include a processor/controller resident on a computer system (e.g., server system 106 and/or electronic device 102). Computing component 1200 may be used to implement various features and/or functionality of embodiments of the systems, devices, and methods disclosed herein. With regard to the above-described embodiments set forth herein in the context of systems, devices, and methods described with reference to FIGS. 1 through 11B, including embodiments involving device 102 and/or server system 106, it may be appreciated additional variations and details regarding the functionality of these embodiments that may be carried out by computing component 1200. In this connection, it will also be appreciated upon studying the present disclosure that features and aspects of the various embodiments (e.g., systems) described herein may be implemented with respect to other embodiments (e.g., methods) described herein without departing from the spirit of the disclosure.

As used herein, the term component may describe a given unit of functionality that may be performed in accordance with one or more embodiments of the present application. As used herein, a component may be implemented utilizing any form of hardware, software, or a combination thereof. For example, one or more processors, controllers, ASICs, PLAs, PALs, CPLDs, FPGAs, logical components, software routines, or other mechanisms may be implemented to make up a component. in embodiments, the various components described herein may be implemented as discrete components or the functions and features described may be shared in part or in total among one or more components. In other words, it should be appreciated that after reading this description, the various features and functionality described herein may be implemented in any given application and may be implemented in one or more separate or shared components in various combinations and permutations.

Even though various features or elements of functionality may be individually described or claimed as separate components, it will be appreciated that upon studying the present disclosure that these features and functionality may be shared among one or more common software and hardware elements, and such description shall not require or imply that separate hardware or software components are used to implement such features or functionality.

Where components of the application are implemented in whole or in part using software, in embodiments, these software elements may be implemented to operate with a computing or processing component capable of carrying out the functionality described with respect thereto. One such example computing component is shown in FIG. 12. Various embodiments are described in terms of example computing component 1200. After reading this description, it will be appreciated how to implement example configurations described herein using other computing components or architectures.

Referring now to FIG. 12, computing component 1200 may represent, for example, computing or processing capabilities found within mainframes, supercomputers, workstations or servers; desktop, laptop, notebook, or tablet computers; hand-held computing devices (tablets, PDA's, smartphones, mobile phones, palmtops, etc.); or the like, depending on the application and/or environment for which computing component 1200 is specifically purposed.

Computing component 1200 may include, for example, one or more processors, controllers, control components, or other processing devices, such as a processor 1210, and such as may be included in circuitry 1205. Processor 1210 may be implemented using a special-purpose processing engine such as, for example, a microprocessor, controller, or other control logic. I$_n$ the illustrated example, processor 1210 is connected to bus 1255 by way of circuitry 1205, although any communication medium may be used to facilitate interaction with other components of computing component 1200 or to communicate externally.

Computing component 1200 may also include one or more memory components, simply referred to herein as main memory 1215. For example, random access memory (RAM) or other dynamic memory may be used for storing information and instructions to be executed by processor 1210 or circuitry 1205. Main memory 1215 may also be used for storing temporary variables or other intermediate information during execution of instructions to be executed by processor 1210 or circuitry 1205. Computing component 1200 may likewise include a read only memory (ROM) or other static storage device coupled to bus 1255 for storing static information and instructions for processor 1210 or circuitry 1205.

Computing component 1200 may also include one or more various forms of information storage devices 1220, which may include, for example, media drive 1230 and storage unit interface 1235. Media drive 1230 may include a drive or other mechanism to support fixed or removable storage media 1225. For example, a hard disk drive, a floppy disk drive, a magnetic tape drive, an optical disk drive, a CD or DVD drive (R or RW), or other removable or fixed media drive may be provided. Accordingly, removable storage media 1225 may include, for example, a hard disk, a floppy disk, magnetic tape, cartridge, optical disk, a CD or DVD, or other fixed or removable medium that is read by, written to, or accessed by media drive 1230. As these examples illustrate, removable storage media 1225 may include a computer usable storage medium having stored therein computer software or data.

In alternative embodiments, information storage devices 1220 may include other similar instrumentalities for allowing computer programs or other instructions or data to be loaded into computing component 1200. Such instrumentalities may include, for example, fixed or removable storage unit 1240 and storage unit interface 1235. Examples of such removable storage units 1240 and storage unit interfaces 1235 may include a program cartridge and cartridge interface, a removable memory (for example, a flash memory or other removable memory component) and memory slot, a PCMCIA slot and card, and other fixed or removable storage units 1240 and storage unit interfaces 1235 that allow software and data to be transferred from removable storage unit 1240 to computing component 1200.

Computing component 1200 may also include a communications interface 1250. Communications interface 1250 may be used to allow software and data to be transferred between computing component 1200 and external devices. Examples of communications interface 1250 include a modem or softmodem, a network interface (such as an Ethernet, network interface card, WiMedia, IEEE 1202.XX, or other interface), a communications port (such as for example, a USB port, IR port, RS232 port Bluetooth® interface, or other port), or other communications interface. Software and data transferred via communications interface 1250 may be carried on signals, which may be electronic, electromagnetic (which includes optical) or other signals capable of being exchanged by a given communications interface 1250. These signals may be provided to/from communications interface 1250 via channel 1245. Channel 1245 may carry signals and may be implemented using a wired or wireless communication medium. Some non-limiting examples of channel 1245 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 1215, storage unit interface 1235, removable storage media 1225, and channel 1245. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing component 1200 or a processor to perform features or functions of the present application as discussed herein.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and implementations, it should be understood that the various features, aspects, and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation," or the like; the term "example" is used to provide illustrative instances of the item in discussion, not an exhaustive or limiting list thereof; the terms "a" or "an" should be read as meaning "at least one," "one or more," or the like; and adjectives such as "standard," "known," and terms of similar meaning should not be construed as limiting the item described to a given time period or to an item available as of a given time, but instead should be read to encompass standard technologies that may be available or known now or at any time in the future. Likewise, where this document refers to technologies that would be appreciated to one of ordinary skill in the art, such technologies encompass that which would be appreciated by the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, may be combined in a single package or separately maintained and may further be distributed in multiple groupings or packages or across multiple locations.

Additionally, the various embodiments set forth herein are described in terms of example block diagrams, flow charts, and other illustrations. As will be appreciated after reading this document, the illustrated embodiments and their various alternatives may be implemented without confinement to the illustrated examples. For example, block diagrams and their accompanying description should not be construed as mandating a particular architecture or configuration.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for training a neural network model, the method comprising:
   classifying inputs using input layer-to-hidden layer connections of the neural network model;
   based on the input classifications, making decisions using hidden layer-to-output layer connections of the neural network model;
   responsive to the input classifying, modulating the input layer-to-hidden layer connections using non-rewarded spike time dependent plasticity (STDP) signals;
   responsive to the decision making, modulating the hidden layer-to-output layer connections using rewarded STDP signals; and
   responsive to the modulation of the input layer-to-hidden layer connections and hidden layer-to-output layer connections, reiterating the input classifying of the input layer-to-hidden layer connections and the decision making of the hidden layer-to-output layer connections.

2. The method of claim 1, wherein the neural network model further comprises:
   an input layer;
   a plurality of hidden layers; and
   an output layer;
   wherein the input layer-to-hidden layer connections connect the input layer to a first hidden layer of the plurality of hidden layers and the hidden layer-to-output layer connections connect a second hidden layer of the plurality of hidden layers to the output layer.

3. The method of claim 2, wherein the plurality of hidden layers are connected together via interlayer connections.

4. The method of claim 3, further comprising modulating the interlayer connections using at least one of non-rewarded STDP signals and rewarded STDP signals.

5. The method of claim 1, wherein modulating the hidden layer-to-output layer connections using rewarded STDP signals comprises:
   sending a reward STDP signal to modulate a first hidden layer-to-output layer connection of the hidden layer-to-output layer connections such that a strength of the first hidden layer-to-output layer connection is increased.

6. The method of claim 5, wherein modulating the hidden layer-to-output layer connections using rewarded STDP further comprises:
   sending a punishment STDP signal to modulate a second hidden layer-to-output layer connection of the hidden layer-to-output layer connections such that a strength of the second hidden layer-to-output layer connection is decreased.

7. A system comprising:
   one or more processors; and
   memory for storing instructions that, when executed by the one or more processors, cause the system to:
   classify inputs using input layer-to-hidden layer connections of a neural network model;

based on the input classifications, make decisions using hidden layer-to-output layer connections of the neural network model;

responsive to the input classifying, modulate the input layer-to-hidden layer connections using non-rewarded spike time dependent plasticity (STDP) signals;

responsive to the decision making, modulate the hidden layer-to-output layer connections using rewarded STDP signals; and responsive to the modulation of the input layer-to-hidden layer connections and hidden layer-to-output layer connections, reiterate the input classifying of the input layer-to-hidden layer connections and the decision making of the hidden layer-to-output layer connections.

8. The system of claim 7, wherein the neural network model further comprises:
an input layer;
a plurality of hidden layers; and
an output layer;
wherein the input layer-to-hidden layer connections connect the input layer to a first hidden layer of the plurality of hidden layers and the hidden layer-to-output layer connections connect a second hidden layer of the plurality of hidden layers to the output layer.

9. The system of claim 8, wherein the plurality of hidden layers are connected together via interlayer connections.

10. The system of claim 9, wherein the stored instructions further cause the system to modulate the interlayer connections using at least one of non-rewarded STDP signals and rewarded STDP signals.

11. The system of claim 7, wherein modulating the hidden layer-to-output layer connections using rewarded STDP signals comprises:
sending a reward STDP signal to modulate a first hidden layer-to-output layer connection of the hidden layer-to-output layer connections such that a strength of the first hidden layer-to-output layer connection is increased.

12. The system of claim 11, wherein modulating the hidden layer-to-output layer connections using rewarded STDP further comprises:
sending a punishment STDP signal to modulate a second hidden layer-to-output layer connection of the hidden layer-to-output layer connections such that a strength of the second hidden layer-to-output layer connection is decreased.

13. Non-transitory computer-readable medium storing instructions, which when executed by one or more processing resources, cause the one or more processing resources to:
classify inputs using input layer-to-hidden layer connections of a neural network model;
based on the input classifications, make decisions using hidden layer-to-output layer connections of the neural network model;
responsive to the input classifying, modulate the input layer-to-hidden layer connections using non-rewarded spike time dependent plasticity (STDP) signals;
responsive to the decision making, modulate the hidden layer-to-output layer connections using rewarded STDP signals; and
responsive to the modulation of the input layer-to-hidden layer connections and hidden layer-to-output layer connections, reiterate the input classifying of the input layer-to-hidden layer connections and the decision making of the hidden layer-to-output layer connections;
wherein:
the neural network model further comprises an input layer, a plurality of hidden layers, and an output layer, and
the input layer-to-hidden layer connections connect the input layer to a first hidden layer of the plurality of hidden layers and the hidden layer-to-output layer connections connect a second hidden layer of the plurality of hidden layers to the output layer.

14. The non-transitory computer-readable medium storing instructions of claim 13, wherein the plurality of hidden layers are connected together via interlayer connections.

15. The non-transitory computer-readable medium storing instructions of claim 14, wherein the stored instructions further cause the one or more processing resources to modulate the interlayer connections using at least one of non-rewarded STDP signals and rewarded STDP signals.

16. The non-transitory computer-readable medium storing instructions of claim 13, wherein modulating the hidden layer-to-output layer connections using rewarded STDP signals comprises:
sending a reward STDP signal to modulate a first hidden layer-to-output layer connection of the hidden layer-to-output layer connections such that a strength of the first hidden layer-to-output layer connection is increased.

17. The non-transitory computer-readable medium storing instructions of claim 16, wherein modulating the hidden layer-to-output layer connections using rewarded STDP further comprises:
sending a punishment STDP signal to modulate a second hidden layer-to-output layer connection of the hidden layer-to-output layer connections such that a strength of the second hidden layer-to-output layer connection is decreased.

* * * * *